(12) United States Patent
Ayyadurai et al.

(10) Patent No.: US 12,521,365 B2
(45) Date of Patent: Jan. 13, 2026

(54) COMPOSITIONS FOR IMPROVING BRAIN HEALTH AND MEMORY

(71) Applicant: CytoSolve, Inc., Cambridge, MA (US)

(72) Inventors: V.A. Shiva Ayyadurai, Cambridge, MA (US); Prabhakar Deonikar, Cambridge, MA (US)

(73) Assignee: CytoSolve, Inc., Cambridge, MA (US)

( * ) Notice: Subject to any disclaimer, the term of this patent is extended or adjusted under 35 U.S.C. 154(b) by 1019 days.

(21) Appl. No.: 17/606,247

(22) PCT Filed: Apr. 24, 2020

(86) PCT No.: PCT/US2020/029950
§ 371 (c)(1),
(2) Date: Oct. 25, 2021

(87) PCT Pub. No.: WO2020/219975
PCT Pub. Date: Oct. 29, 2020

(65) Prior Publication Data
US 2022/0296558 A1 Sep. 22, 2022

Related U.S. Application Data

(60) Provisional application No. 62/839,550, filed on Apr. 26, 2019.

(51) Int. Cl.
| | | |
|---|---|---|
| A61P 25/28 | (2006.01) |
| A61K 9/16 | (2006.01) |
| A61K 31/015 | (2006.01) |
| A61K 31/192 | (2006.01) |
| A61K 31/197 | (2006.01) |
| A61K 31/343 | (2006.01) |
| A61K 31/375 | (2006.01) |
| A61K 31/685 | (2006.01) |
| A61K 31/7012 | (2006.01) |

(52) U.S. Cl.
CPC .......... *A61K 31/343* (2013.01); *A61K 9/1617* (2013.01); *A61K 31/015* (2013.01); *A61K 31/192* (2013.01); *A61K 31/197* (2013.01); *A61K 31/375* (2013.01); *A61K 31/685* (2013.01); *A61K 31/7012* (2013.01); *A61P 25/28* (2018.01)

(58) Field of Classification Search
CPC .. A61K 31/343; A61K 9/1617; A61K 31/015; A61K 31/197; A61K 31/375; A61K 31/685; A61K 31/7012; A61P 25/28
See application file for complete search history.

(56) References Cited

U.S. PATENT DOCUMENTS

| | | |
|---|---|---|
| 6,284,774 B1 | 9/2001 | Wright et al. |
| 7,935,365 B2 | 5/2011 | Dror et al. |
| 2002/0013481 A1 | 1/2002 | Schonrock et al. |
| 2003/0170328 A1 | 9/2003 | Haines et al. |
| 2006/0216251 A1 | 9/2006 | Morariu |
| 2007/0049576 A1 | 3/2007 | Barlow et al. |
| 2007/0231405 A1* | 10/2007 | Gorban .................. A61K 36/48 424/737 |
| 2008/0044487 A1 | 2/2008 | Bruheim et al. |
| 2009/0074857 A1 | 3/2009 | Dror et al. |
| 2011/0144063 A1 | 6/2011 | Dror et al. |
| 2012/0114719 A1 | 5/2012 | Morariu |
| 2012/0116913 A1 | 5/2012 | Goolkasian |
| 2014/0051663 A1 | 2/2014 | Ben Dror et al. |
| 2014/0134222 A1 | 5/2014 | Morariu |
| 2015/0056299 A1* | 2/2015 | Randall ................ A61K 31/202 424/646 |
| 2016/0015820 A1 | 1/2016 | Ben Dror et al. |
| 2017/0173166 A1 | 6/2017 | Ben Dror et al. |
| 2017/0368187 A1 | 12/2017 | Ben Dror et al. |

FOREIGN PATENT DOCUMENTS

| | | |
|---|---|---|
| CN | 103083501 A | 5/2013 |
| CN | 108902719 A | 11/2018 |
| WO | WO 2004/112818 | 12/2004 |

(Continued)

OTHER PUBLICATIONS

Rathee, Permender, et al. "Natural Memory Boosters." Pharmacognosy Review, vol. 2, No. 4, 2008, pp. 249-256. (Year: 2008).*
Extended European Search Report issued on May 8, 2023 in European Patent Application No. 20795218.5, 16 pages.
Lopatina Ng et al: "The influence of combinations of encoded amino acids on associative learning in the honeybeeApis melliferaL", Journal of Evolutionary Biochemistry and Physiology, Pleiades Publishing, Moscow, vol. 53, No. 2, Jun. 2, 2017 (Jun. 2, 2017), pp. 123-128, XP036248793, ISSN: 0022-0930, DOI: 10.1134/S1234567817020045 [retrieved on Jun. 2, 2017].
European Office Action issued Mar. 28, 2024 in corresponding European Patent Application No. 20 795 218.5, 5 pages.
Partial Supplementary European Search Report issued Jan. 4, 2023, in corresponding European Patent Application No. 20795218.5, 15 pages.
Fayçal Guedj et al., "Green Tea Polyphenols Rescue of Brain Defects Induced by Overexpression of DYRK1A", PLOS ONE, vol. 4, No. 2, Feb. 1, 2009, pp. e4606-I, XP055052997, 8 pages.
Amadio et al, "Effect of Clotting Duration and Temperature on BDNF Measurement in Human Serum", Int. J Mol Sci., Sep. 15, 2017, 5 pages.

(Continued)

*Primary Examiner* — Clinton A Brooks
*Assistant Examiner* — Kyle Nottingham
(74) *Attorney, Agent, or Firm* — Oblon, McClelland, Maier & Neustadt, L.L.P.

(57) ABSTRACT

The present disclosure relates to oral compositions that include at least two agents selected from: agents that increase the concentration of glutamate; agents that increase dopamine production; agents that increase the concentration of brain-derived neurotrophic factor (BDNF); NMDA and/or AMPA receptor modulators; and acetylcholinesterase inhibitors. In son embodiments, a composition as provided herein includes D-glutamine present in an amount of about 20% to about 30% w/w of the composition; ginkgolide B present in an amount of about 0.1% to about 0.4% w/w of the composition; phosphatidylserine present in an amount of about 65% to about 80% w/w of the composition; and ascorbic acid present in an amount of about 0.5% to about 2.5% w/w of the composition. Such compositions are useful for improving memory and/or focus.

2 Claims, 8 Drawing Sheets

(56) References Cited

FOREIGN PATENT DOCUMENTS

| WO | WO 2011/050474 A1 | 5/2011 |
|----|-------------------|--------|
| WO | WO 2019/002435    | 1/2019 |

OTHER PUBLICATIONS

Ayyadurai et al, "CytoSolve: A Scalable Computational Method for Dynamic Integration of Multiple Molecular Pathway Models", Cellular and Molecular Bioengineering, Mar. 2011, 18 pages.

Ayyadurai et al, "Do GMOs Accumulate Formaldehyde and Disrupt Molecular Systems Equilibria? Systems Biology May Provide Answers?", Agriculture Sceinces, Jul. 1015, 33 pages.

Ayyadurai et al, "Services-Based Systems Architecture for Modeling the Whole Cell: A Distributed Collaborative Engineering Systems Approach" Commun Med Care Compunetics, Nov. 16, 2010, 54 pages.

Bachelard et al, "Measurement of Free Intracellular Calcium in the Brain by 19F-Nuclear Magnetic Resonance Spectroscopy", J Neurochem, Oct. 1988, 51(4): 1311-3.

Baudry et al, "Phosphatidylserine increases the affinity of the AMPA/quisqualate receptor in rat brain membranes", Behav. Neural. Biol, Mar. 1991, 55(2):137-40.

Chefer et al, "Overview of Brain Microdialysis", Current Protocols, Apr. 15, 2009, 28 pages.

Domith et al, "Vitamin C modulates glutamate transport and NMDA receptor function in the retina", J Neurochem, Feb. 2018; 144(4):408-420.

Edwards et al, "Addition of glutamate to serum free culture promotes recovery of electrical activity in adult hippocampal neurons in vitro", J Neurosci Methods, Jul. 15, 2011, 9 pages.

Gomez-Cambronero et al., "Measurements of phospholipases A2, C, and D (PLA2, PLC, and PLD). In vitro microassays, analysis of enzyme isoforms, and intact-cell assays", Afethods Mol. Biol., 2003:218: 155-76.

Grienberger et al. "Imaging Calcium in Neurons", Neuron. Mar. 8, 2012, 73(5):862-85.

Koo et al., "In Silico Modeling of Shear-Stress-Induced Nitric Oxide Production in Endothelial Cells through Systems Biology", Biophysical Journal, May 2013, 12 pages.

Labban et al., "The Effect of Acute Exercise on Encoding and Consolidation of Long-Term Memory", J Sport Exerc Psychol, Dec. 1, 2018, 40(6):336-342.

Nordsletten et al., "Multiscale Mathematical Modeling to Support Drug Development", IEEE Transactions on Biomedical Engineering, Dec. 2011, 5 pages.

Ozel et al., "Glutamate oxidase biosensor based on mixed ceria and titania nanoparticles for the detection of glutamate in hypoxic environments", Biosens Bioelectron, Feb. 2014, 15:52:397-402.

PCT International Preliminary Report on Patentability in International Appln. PCT/US2020/029950, dated Nov. 4, 2021, 9 pages.

PCT International Search Report and Written Opinion in International Appln. PCT/US2020/029950, dated Aug. 4, 2020, 11 pages.

Polacchini et al., "A method for reproducible measurements of serum BDNF: comparison of the performance of six commercial assays", Sci. Rep. 2015; 5: 17989.

Sleiman et al., "Exercise promotes the expression of brain derived neurotrophic factor (BDNF) through the action of the ketone body B-hydroxybutyrate", Elife, Jun. 2, 2016, 21 pages.

Sweeney et al., "Pericytes of the neurovascular unit: key functions and signaling pathways", Nature Neuroscience, Jun. 2016, 33 pages.

Yao and Zhou, "Enhancing NMDA Receptor Function: Recent Progress on Allosteric Modulators", Neural Plast., Jan. 9, 2017,— pages.

Zheng et al., "Neurocognitive performance and repeated-dose intravenous ketamine in major depressive disorder", J Affect Disord, Mar. 1, 2019; 246:241-247.

\* cited by examiner

COMPOSITIONS FOR IMPROVING BRAIN HEALTH AND MEMORY

CROSS-REFERENCE TO RELATED APPLICATIONS

This application is a National Stage application under 35 U.S.C. § 371 of International Application No. PCT/US2020/029950 having an International Filing Date of Apr. 24, 2020, which claims the benefit of U.S. Provisional Application No. 62/839,550, filed Apr. 26, 2019, the contents of which are hereby incorporated by reference.

TECHNICAL FIELD

This disclosure relates to the field of dietary supplements. For example, this disclosure relates to oral compositions that include one or more agents selected from: agents that increase the concentration of glutamate; agents that increase dopamine production; agents that increase the concentration of brain-derived neurotrophic factor (BDNF); NMDA and/or AMPA receptor modulators; and acetylcholinesterase inhibitors. Such compositions are useful for improving memory and/or focus.

BACKGROUND

There are numerous approaches used to enhance mood and cognitive performance in normal individuals, including pharmaceutical or nutraceutical interventions, aerobic exercise, and some cognitive training programs. Specifically, some of these approaches aim to improve memory, focus, and/or attention. The process of memory is classified as acquiring, encoding, enhancing, maintaining, and recalling. Several pathways are known to play a role in memory and focus including glutamate receptor signaling, brain derived neurotrophic factor (BDNF) synthesis, and acetylcholine signaling. Methods and compositions for improving memory are highly desirable.

SUMMARY

Provided herein are compositions comprising two or more agents that increase the concentration of glutamate. In some embodiments, the composition further comprises an agent that increases dopamine production. In some embodiments, the agent that increases the concentration of glutamate modulates N-methyl-D-aspartate (NMDA) receptor signaling and/or α-amino-3-hydroxy-5-methyl-4-isoxazolepropionic acid (AMPA) receptor signaling. In some embodiments, the agent that increases the concentration of glutamate comprises one or more of: a terpene or terpenoid; an amino acid; a carboxylic acid or a carboxylic acid derivative; and a phospholipid.

Also provided herein are compositions comprising two or more of: a terpene or terpenoid; an amino acid; a carboxylic acid or a carboxylic acid derivative; and a phospholipid.

In some embodiments, the terpene or terpenoid is selected from the group consisting of: aromadendrane-4β,10α-diol, onoseriolide, podoandin, 13-hydroxy-8,9-dehydroshizukanolide, ginkgolide B, ginkgolide A, ginkgolide J, ginkgolide C, ginkgolide J, and a combination thereof. In some embodiments, the terpene or terpenoid is a terpenic lactone. In some embodiments, the lactone is selected from the group consisting of: ginkgolide B, ginkgolide A, ginkgolide C, gingkolide J, ginkgolide M, bilobalide, onoseriolide, podoandin, 13-hydroxy-8,9-dehydroshizukanolide, and a combination thereof. In some embodiments, the terpene or terpenoid is ginkgolide B.

In some embodiments, the terpene or terpenoid is present in an amount of about 0.05% to about 50% w/w of the composition. In some embodiments, the terpene or terpenoid is present in an amount of about 0.01% to about 10% w/w of the composition. In some embodiments, the terpene or terpenoid is present in an amount of about 0.1% to about 10% w/w of the composition. In some embodiments, the terpene or terpenoid is present in an amount of about 0.01% to about 2% w/w of the composition. In some embodiments, the terpene or terpenoid is present in an amount of about 0.1% to about 0.4% w/w of the composition. In some embodiments, the terpene or terpenoid is present in an amount of about 0.25% w/w of the composition.

In some embodiments, the amino acid is an α-amino acid. In some embodiments, the amino acid is selected from the group consisting of: D-glutamine, L-glutamine, L-alanine, D-alanine, D-cycloserine, N-methylglycine, L-serine, D-serine, N,N,N-trimethylglycine, 3-amino-1-hydroxypyrrolid-2-one, (R)—(N-[3-(4'-fluorophenyl)-3-{4'-phenylphenoxy)propyl])sarcosine, and N-methyl-N-[3-[(4-trilfluoromethyl)phenoxy]-3-phenyl-propyl]glycine. In some embodiments, the amino acid is D-glutamine.

In some embodiments, the amino acid is present in an amount of about 5% to about 50% w/w of the composition. In some embodiments, the amino acid is present in an amount of about 10% to about 40% w/w of the composition. In some embodiments, the amino acid is present in an amount of about 20% to about 30% w/w of the composition. In some embodiments, the amino acid is present in an amount of about 25% w/w of the composition.

In some embodiments, the carboxylic acid or carboxylic acid derivative is selected from the group consisting of: ascorbic acid, an ascorbate, dehydroascorbic acid, dehydroascorbate, a ketoaldonic acid, sialic acid and a combination thereof. In some embodiments, the carboxylic acid or a carboxylic acid derivative is ascorbic acid.

In some embodiments, the carboxylic acid or a carboxylic acid derivative is present in an amount of about 0.01% to about 50% w/w of the composition. In some embodiments, the carboxylic acid or a carboxylic acid derivative is present in an amount of about 0.05% to about 30% w/w of the composition. In some embodiments, the carboxylic acid or a carboxylic acid derivative is present in an amount of about 0.1% to about 10% w/w of the composition. In some embodiments, the carboxylic acid or a carboxylic acid derivative is present in an amount of about 0.1% to about 5% w/w of the composition. In some embodiments, the carboxylic acid or a carboxylic acid derivative is present in an amount of about 0.5% to about 2.5% w/w of the composition. In some embodiments, the carboxylic acid or a carboxylic acid derivative is present in an amount of about 1.5% w/w of the composition.

In some embodiments, the phospholipid comprises phosphatidylserine. In some embodiments, the phospholipid is phosphatidylserine. In some embodiments, the phospholipid is present in an amount of about 10% to about 90% w/w of the composition. In some embodiments, the phospholipid is present in an amount of about 30% to about 85% w/w of the composition. In some embodiments, the phospholipid is present in an amount of about 60% to about 80% w/w of the composition. In some embodiments, the phospholipid is present in an amount of about 50% to about 90% w/w of the composition. In some embodiments, the phospholipid is present in an amount of about 65% to about 80% w/w of the composition. In some embodiments, the phospholipid is present in an amount of about 74% w/w of the composition.

In some embodiments, the agent that increases dopamine production is an aromatic amino acid. In some embodiments, the aromatic amino acid is selected from the group consisting of: tyrosine, L-DOPA, and phenylalanine. In some embodiments, the agent that increases dopamine production is tyrosine. In some embodiments, the agent that increases dopamine production is present in an amount of about 5% to about 50% w/w of the composition. In some embodiments, the agent that increases dopamine production is present in an amount of about 10% to about 40% w/w of the composition. In some embodiments, the agent that increases dopamine production is present in an amount of about 20% to about 30% w/w of the composition. In some embodiments, the agent that increases dopamine production is present in an amount of about 25% w/w of the composition.

In some embodiments, the composition comprises: D-glutamine; ginkgolide B; and phosphatidylserine. In some embodiments, the composition comprises: D-glutamine; ginkgolide B; phosphatidylserine; and ascorbic acid.

In some embodiments, the composition comprises: D-glutamine present in an amount of about 20% to about 30% w/w of the composition; ginkgolide B present in an amount of about 0.1% to about 0.4% w/w of the composition; phosphatidylserine present in an amount of about 65% to about 80% w/w of the composition; and ascorbic acid present in an amount of about 0.5% to about 2.5% w/w of the composition. In some embodiments, the composition comprises: D-glutamine present in an amount of about 24.6% w/w of the composition; ginkgolide B present in an amount of about 0.25% w/w of the composition; phosphatidylserine present in an amount of about 73.7% w/w of the composition; and ascorbic acid present in an amount of about 1.5% w/w of the composition.

In some embodiments, the composition further comprises one or more excipients, diluents, or carriers.

In some embodiments, the composition is configured as a powder.

Also provided herein are methods for improving and/or stabilizing the short-term memory of a subject comprising administering to the subject a composition as described herein. In some embodiments, the composition is administered orally.

Also provided herein are compositions comprising: one or more agents that increase brain-derived neurotrophic factor (BDNF); and one or more NMDA and/or AMPA receptor modulators. In some embodiments, the one or more agents that increase brain-derived neurotrophic factor (BDNF) synthesis modulate CREB. In some embodiments, the one or more agents that increase brain-derived neurotrophic factor (BDNF) are selected from the group consisting of: a benzopyran and/or a chromanol; a phenol; and a flavone, a flavan, and/or a polyphenol. In some embodiments, the one or more NMDA and/or AMPA receptor modulators are selected from the group consisting of: a phospholipid vitamin C, a NMDAR-PAM. In some embodiments, the NMDAR-PAM is selected from the group consisting of: a phenanthrene derivative, a naphthalene derivative, a coumarin derivative, and a combination thereof.

Also provided herein are compositions comprising one or more of: a benzopyran and/or chromanol; a flavone, a flavan, and/or a polyphenol; and a phospholipid.

In some embodiments, the benzopyran and/or chromanol is selected from the group consisting of: α-tocopherol, β-tocopherol, γ-tocopherol, δ-tocopherol, α-tocotrienol, β-tocotrienol, γ-tocotrienol, δ-tocotrienol, and a combination thereof.

In some embodiments, the benzopyran and/or chromanol is present in an amount of about 20% to about 90% w/w of the composition. In some embodiments, the benzopyran and/or chromanol is present in an amount of about 10% to about 80% w/w of the composition. In some embodiments, the benzopyran and/or chromanol is present in an amount of about 20% to about 70% w/w of the composition. In some embodiments, the benzopyran and/or chromanol is present in an amount of about 50% to about 60% w/w of the composition. In some embodiments, the benzopyran and/or chromanol is present in an amount of about 30% to about 60% w/w of the composition. In some embodiments, the benzopyran and/or chromanol is present in an amount of about 56% w/w of the composition. In some embodiments, the benzopyran and/or chromanol is vitamin E.

In some embodiments, the flavone, flavan, and/or a polyphenol comprise a hydroxyflavan, epigallocatechin-3-gallate (EGCG), catechin, resveratrol, epicatechin, hesperidin, or a combination thereof. In some embodiments, the flavone, flavan, and/or a polyphenol is epicatechin. In some embodiments, the flavone, flavan, and/or a polyphenol is EGCG.

In some embodiments, the flavone or flavan is present in an amount of about 1% to about 60% w/w of the composition. In some embodiments, the flavone or flavan is present in an amount of about 5% to about 40% w/w of the composition. In some embodiments, the flavone or flavan is present in an amount of about 5% to about 30% w/w of the composition. In some embodiments, the flavone or flavan is present in an amount of about 10% to about 20% w/w of the composition. In some embodiments, the flavone or flavan is present in an amount of about 16% w/w of the composition.

In some embodiments, the phospholipid comprises phosphatidylserine. In some embodiments, the phospholipid is present in an amount of about 5% to about 70% w/w of the composition. In some embodiments, the phospholipid is present in an amount of about 10% to about 60% w/w of the composition. In some embodiments, the phospholipid is present in an amount of about 5% to about 55% w/w of the composition. In some embodiments, the phospholipid is present in an amount of about 20% to about 40% w/w of the composition. In some embodiments, the phospholipid is present in an amount of about 25% to about 35% w/w of the composition. In some embodiments, the phospholipid is present in an amount of about 28% w/w of the composition.

In some embodiments, the composition comprises: vitamin E; epicatechin; and phosphatidylserine. In some embodiments, the composition comprises: vitamin E present in an amount of about 50% to about 60% w/w of the composition; epicatechin present in an amount of about 12% to about 20% w/w of the composition; and phosphatidylserine present in an amount of about 25% to about 35% w/w of the composition. In some embodiments, the composition comprises: vitamin E present in an amount of about 56% w/w of the composition; epicatechin present in an amount of about 16% w/w of the composition; and phosphatidylserine present in an amount of about 28% w/w of the composition.

In some embodiments, the composition further comprises one or more excipients, diluents, or carriers. In some embodiments, the composition is configured as a powder.

Also provided herein are methods for improving and/or stabilizing the long-term memory of a subject comprising administering to the subject a composition as described herein. In some embodiments, the method further comprises improving the focus of the subject.

Also provided herein are methods for improving and/or stabilizing the focus of a subject comprising administering to the subject a composition as described herein. In some embodiments, the method further comprises improving the long-term memory of the subject.

In some embodiments, the composition is administered orally.

Also provided herein are compositions comprising two or more acetylcholinesterase inhibitors. In some embodiments, the two or more acetylcholinesterase inhibitors are selected from the group consisting of: a flavone or flavan; a carboxylic acid or a carboxylic acid derivative; and a terpene or terpenoid.

Also provided herein are compositions comprising: a flavone or flavan; a carboxylic acid or a carboxylic acid derivative; and a terpene and/or terpenoid.

In some embodiments, the flavone or flavan is selected from the group consisting of a trihydroxyflavone, a pentahydroxyflavone, a tetrahydroxyflavone, and a combination thereof. In some embodiments, the flavone or flavan is selected from the group consisting of: quercetin, luteolin, and a combination thereof.

In some embodiments, the flavone or flavan is present in an amount of about 10% to about 85% w/w of the composition. In some embodiments, the flavone or flavan is present in an amount of about 5% to about 60% w/w of the composition. In some embodiments, the flavone or flavan is present in an amount of about 20% to about 60% w/w of the composition. In some embodiments, the flavone or flavan is present in an amount of about 30% to about 50% w/w of the composition. In some embodiments, the flavone or flavan is present in an amount of about 45% to about 55% w/w of the composition. In some embodiments, the flavone or flavan is present in an amount of about 48% w/w of the composition. In some embodiments, the flavone or flavan is a combination of quercetin and luteolin. In some embodiments, the quercetin is present in an amount of about 20% to about 80% w/w of the composition. In some embodiments, the quercetin is present in an amount of about 30% to about 60% w/w of the composition. In some embodiments, the quercetin is present in an amount of about 5% to about 15% w/w of the composition. In some embodiments, the quercetin is present in an amount of about 14% w/w of the composition. In some embodiments, the luteolin is present in an amount of about 20% to about 60% w/w of the composition. In some embodiments, the luteolin is present in an amount of about 30% to about 50% w/w of the composition. In some embodiments, the luteolin is present in an amount of about 10% to about 50% w/w of the composition. In some embodiments, the luteolin is present in an amount of about 34% w/w of the composition.

In some embodiments, the carboxylic acid or a carboxylic acid derivative is selected from the group consisting of: caffeic acid, hydrocinnamic acid, rosmarinic acid, and a combination thereof. In some embodiments, the carboxylic acid or a carboxylic acid derivative is present in an amount of about 0.5% to about 80% w/w of the composition. In some embodiments, the carboxylic acid or a carboxylic acid derivative is present in an amount of about 20% to about 70% w/w of the composition. In some embodiments, the carboxylic acid or a carboxylic acid derivative is present in an amount of about 40% to about 60% w/w of the composition. In some embodiments, the carboxylic acid or a carboxylic acid derivative is present in an amount of about 35% to about 75% w/w of the composition. In some embodiments, the carboxylic acid or a carboxylic acid derivative is present in an amount of about 50% to about 60% w/w of the composition. In some embodiments, the carboxylic acid or a carboxylic acid derivative is present in an amount of about 54% w/w of the composition. In some embodiments, the carboxylic acid or a carboxylic acid derivative is a combination of two or more carboxylic acids or carboxylic acid derivatives.

In some embodiments, the carboxylic acid or a carboxylic acid derivative is a combination of caffeic acid and rosmarinic acid. In some embodiments, the caffeic acid is present in an amount of about 20% to about 70% w/w of the composition. In some embodiments, the caffeic acid is present in an amount of about 40% to about 60% w/w of the composition. In some embodiments, the caffeic acid is present in an amount of about 50% w/w of the composition. In some embodiments, rosmarinic acid is present in an amount of about 0.5% to about 50% w/w of the composition. In some embodiments, rosmarinic acid is present in an amount of about 1% to about 30% w/w of the composition. In some embodiments, rosmarinic acid is present in an amount of about 2% to about 10% w/w of the composition. In some embodiments, rosmarinic acid is present in an amount of about 4% w/w of the composition. In some embodiments, the hydrocinnamic acid is present in an amount of about 1% to about 10% w/w of the composition.

In some embodiments, the terpene and/or terpenoid is selected from the group consisting of: asiatic acid, ursolic acid, huperzine A, and a combination thereof. In some embodiments, the terpene and/or terpenoid is present in an amount of about 0.5% to about 75% w/w of the composition. In some embodiments, the terpene and/or terpenoid is present in an amount of about 1% to about 50% w/w of the composition. In some embodiments, the terpene and/or terpenoid is present in an amount of about 10% to about 50% w/w of the composition. In some embodiments, the terpene and/or terpenoid is present in an amount of about 30% to about 40% w/w of the composition. In some embodiments, the terpene and/or terpenoid is present in an amount of about 35% w/w of the composition. In some embodiments, the terpene and/or terpenoid is a combination of two or more terpenes and/or terpenoids.

In some embodiments, the terpene and/or terpenoid is a combination of asiatic acid, ursolic acid, and huperzine A.

In some embodiments, the asiatic acid is present in an amount of about 5% to about 70% w/w of the composition. In some embodiments, the asiatic acid is present in an amount of about 10% to about 50% w/w of the composition. In some embodiments, the asiatic acid is present in an amount of about 20% to about 30% w/w of the composition. In some embodiments, the asiatic acid is present in an amount of about 22% to about 32% w/w of the composition. In some embodiments, the asiatic acid is present in an amount of about 27% w/w of the composition.

In some embodiments, ursolic acid is present in an amount of about 1% to about 50% w/w of the composition. In some embodiments, ursolic acid is present in an amount of about 5% to about 20% w/w of the composition. In some embodiments, ursolic acid is present in an amount of about 1% to about 10% w/w of the composition. In some embodiments, ursolic acid is present in an amount of about 6% w/w of the composition.

In some embodiments, huperzine A is present in an amount of about 1% to about 40% w/w of the composition. In some embodiments, huperzine A is present in an amount of about 1.5% to about 20% w/w of the composition. In some embodiments, huperzine A is present in an amount of about 0.05% to about 5% w/w of the composition. In some embodiments, huperzine A is present in an amount of about 2% w/w of the composition.

In some embodiments, the composition comprises two or more of: huperzine A; asiatic acid; luteolin; quercetin; rosmarinic acid; ursolic acid; and caffeic acid. In some embodiments, the composition comprises three or more of: huperzine A; asiatic acid; luteolin; quercetin; rosmarinic acid; ursolic acid; and caffeic acid. In some embodiments, the composition comprises four or more of: huperzine A; asiatic acid; luteolin; quercetin; rosmarinic acid; ursolic acid; and caffeic acid. In some embodiments, the composition comprises five or more of: huperzine A; asiatic acid; luteolin; quercetin; rosmarinic acid; ursolic acid; and caffeic acid. In some embodiments, the composition comprises six or more of: huperzine A; asiatic acid; luteolin; quercetin; rosmarinic acid; ursolic acid; and caffeic acid.

In some embodiments, the composition comprises: huperzine A present in an amount of about 0.05% to about 5% w/w of the composition; asiatic acid present in an amount of about 22% to about 32% w/w of the composition; luteolin present in an amount of about 10% to about 50% w/w of the composition; quercetin present in an amount of about 5% to about 15% w/w of the composition; rosmarinic acid present in an amount of about 1% to about 10% w/w of the composition; ursolic acid present in an amount of about 1% to about 10% w/w of the composition; and caffeic acid present in an amount of about 40% to about 60% w/w of the composition.

In some embodiments, the composition comprises: huperzine A present in an amount of about 2% w/w of the composition; asiatic acid present in an amount of about 27% w/w of the composition; luteolin present in an amount of about 34% w/w of the composition; quercetin present in an amount of about 14% w/w of the composition; rosmarinic acid present in an amount of about 4% w/w of the composition; ursolic acid present in an amount of about 6% w/w of the composition; and caffeic acid present in an amount of about 50% w/w of the composition.

In some embodiments, the composition further comprises one or more excipients, diluents, or carriers.

In some embodiments, the composition is a configured as a powder.

Also provided herein is a method for improving and/or stabilizing the short-term memory of a subject comprising administering to the subject a composition as described herein.

Also provided herein is a method for improving and/or stabilizing the long-term memory of a subject comprising administering to the subject a composition as described herein.

Also provided herein is a method for maintaining memory of a subject comprising administering to the subject a composition as described herein. In some embodiments, the method further comprises improving the focus of the subject.

Also provided herein is a method for improving the focus of a subject comprising administering to the subject a composition as described herein. In some embodiments, method further comprises improving the long-term memory of the subject.

In some embodiments, the composition is administered orally.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
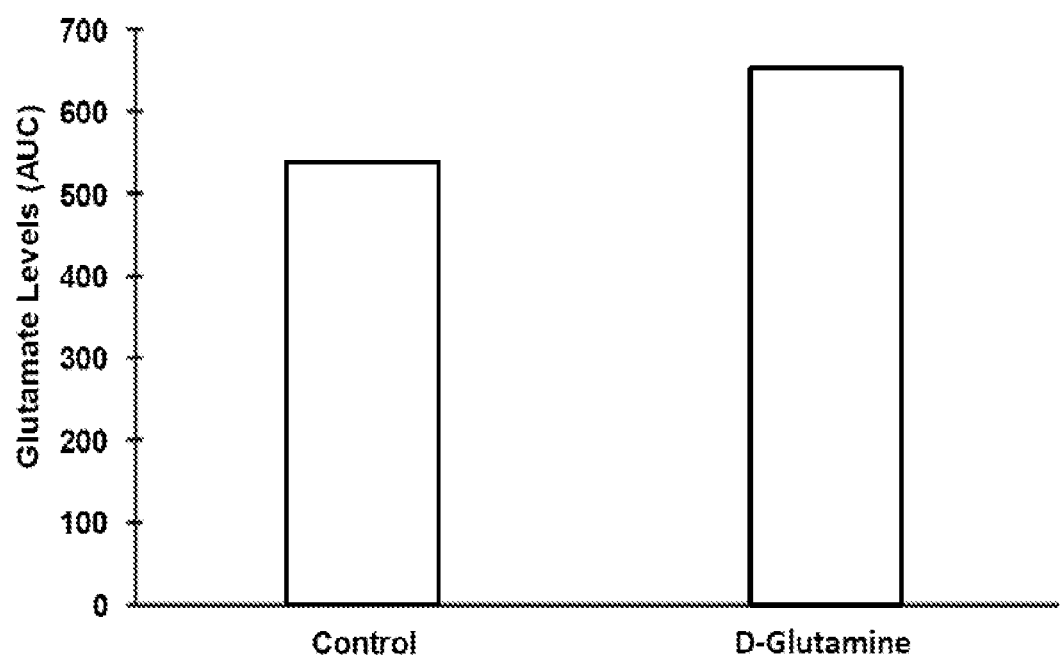
FIG. 1 is a bar graph comparing the AUC of glutamate levels for D-glutamine versus a control. The plot is based on a biomolecular computational model using CytoSolve® and modeling mechanisms of the glutamine-glutamate cycle pathway.

Memory refers to a process by which new information, for example from a surrounding environment, a learned experience, or knowledge, is acquired, encoded, and recalled. It can be divided into three types: short-term memory, long-term memory, and working memory (although working memory and short-term memory are not completely distinct from each other). Generally, long-term memory is a vast store of knowledge and a record of prior events whereas short-term memory is related to the brain's capability of holding a limited amount of information in a very accessible state temporarily. Methods and compositions for improving memory are highly desirable.

Accordingly, the present application provides oral compositions that include at least two agents selected from: agents that increase the concentration of glutamate; agents that increase dopamine production; agents that increase the concentration of brain-derived neurotrophic factor (BDNF); NMDA and/or AMPA receptor modulators; and acetylcholinesterase inhibitors useful for improving memory and/or focus.

Definitions

As used herein, the phrase an "effective amount" of an active agent or ingredient refers to an amount of the active agent or ingredient sufficient enough to measure an effect such as improved memory, cognition, and/or focus. Effective amounts of the active agent will vary with the kind of active agent chosen, the particular condition or conditions being treated, the severity of the condition, the duration of the administration, the specific components of the composition being used, and like factors.

As used herein, "subject" refers to any subject, particularly a mammalian subject, for whom diagnosis, prognosis, or therapy is desired, for example, a human.

Reference to the term "about" has its usual meaning in the context of compositions to allow for reasonable variations in amounts that can achieve the same effect and also refers herein to a value of plus or minus 10% of the provided value. For example, "about 20" means or includes amounts from 18 to and including 22.

Unless otherwise defined, all technical and scientific terms used herein have the same meaning as commonly understood by one of ordinary skill in the art to which this invention belongs. In case of conflict, the present specification, including definitions, will control. Throughout this specification and claims, the word "comprise," or variations such as "comprises" or "comprising" will be understood to imply the inclusion of a stated integer or group of integers but not the exclusion of any other integer or group of integers. Unless otherwise required by context, singular terms shall include pluralities and plural terms shall include the singular. As used herein, the singular form "a", "an", and "the" include plural references unless indicated otherwise. For example, "an" excipient includes one or more excipients. It is understood that aspects and variations of the invention described herein include "consisting of" and/or "consisting essentially of" aspects and variations.

Compositions

The present disclosure relates to oral compositions that include one or more of: agents that increase the concentration of glutamate; agents that increase dopamine production, e.g., dopamine precursors; agents that increase the concentration of brain-derived neurotrophic factor (BDNF); NMDA and/or AMPA receptor modulators; and acetylcholinesterase inhibitors. For example, the one or more agents can be at least two agents that increase the concentration of glutamate, e.g., the composition can comprise two, three, four, or five agents that increase the concentration of glutamate. In some embodiments, the one or more agents can be at least one agent that increases the concentration of BDNF and at least one NMDA and/or AMPA receptor modulator, e.g., the composition can comprise one, two, or three agents that increase the concentration of BDNF and one, two, or three NMDA and/or AMPA receptor modulators. In some embodiments, the one or more agents can be at least two acetylcholinesterase inhibitors, e.g., the composition can comprise two, three, four, five, six, seven, eight, or nine acetylcholinesterase inhibitors.

As another example, the present disclosure relates to oral compositions that include one or more of: a phospholipid; a terpene or terpenoid; an amino acid; a carboxylic acid or a carboxylic acid derivative; a benzopyran and/or chromanol; a flavone or flavan; a polyphenol; and an alkaloid. For example, the composition can comprise two or more of: an amino acid; a terpene; a phospholipid; and a carboxylic acid or derivative thereof. In some embodiments, the composition can comprise two or more of: a benzopyran and/or chromanol; a phospholipid; and a flavone and/or flavan. In some embodiments, the composition can comprise two or more of: a flavone or flavan; a carboxylic acid or a carboxylic acid derivative; and a terpene and/or terpenoid.

Agents that Increase the Concentration of Glutamate

In some embodiments, a composition as described herein can comprise an agent that increases the concentration of glutamate. Many agents that increase the concentration of glutamate are known to one of skill in the art. For example, in some embodiments, an agent that increases the concentration of glutamate is a modulator of N-methyl-D-aspartate (NMDA) receptor signaling and/or α-amino-3-hydroxy-5-methyl-4-isoxazolepropionic acid (AMPA) receptor signaling, e.g., an NMDA and/or AMPA receptor modulator. Non-limiting examples of NMDA and/or AMPA receptor modulators include phosphatidylserine, vitamin C, allosteric positive modulators of NMDA receptors, such as a phenanthrene derivative, a naphthalene derivative, and a coumarin derivative (see, e.g., Baudry et al. *Behav. Neural. Biol.* 1991 March; 55(2):137-40; Domith et al. *J. Neurochem.* 2018; 144(4):408-420; and Yao and Zhou. *Neural Plast.* 2017; 2017:2875904; each of which is incorporated by reference herein in its entirety). Modulation of an NMDA and/or AMPA receptor can affect intracellular $Ca^{2+}$ concentrations in the brain. There are also many methods known to one of ordinary skill in the art for measuring intracellular $Ca^{2+}$ concentrations, e.g., in the brain, including an in vivo measurement of intracellular $Ca^{2+}$ concentration using 19F-nuclear magnetic resonance spectroscopy and an in vitro measurement of intracellular $Ca^{2+}$ concentration using fluorescence spectroscopy (see. e.g., Bachelard et al. *J Neurochem.* 1988 October; 51(4):1311-3; and Grienberger et al. *Neuron.* 2012 Mar. 8; 73(5):862-85; each of which is incorporated herein by reference in its entirety).

In some embodiments, the agent that increases the concentration of glutamate is an agent that affects the glutamate-glutamine cycle, e.g., the glutamate-glutamine neurotransmitter cycle. For example, the agent can affect the glutamate-glutamine neurotransmitter cycle such that the extracellular concentration of glutamate in the brain increases, e.g., as compared to before exposure to the agent. Non-limiting examples of an agent can affect the cycle such that the extracellular concentration of glutamate in the brain include D-glutamine, L-glutamine, L-alanine, D-alanine, D-cycloserine, N-methylglycine, L-serine, D-serine, N,N,N-trimethylglycine, 3-amino-1-hydroxypyrrolid-2-one, (R)—(N-[3-(4'-fluorophenyl)-3-{4'-phenylphenoxy)propyl])sarcosine, and N-methyl-N-[3-[(4-trilfluoromethyl)phenoxy]-3-phenyl-propyl]glycine. Several methods for measuring glutamate concentration are known to one of ordinary skill in the art. Non-limiting examples of such methods include: microdialysis and an electrochemical biosensor. For example, samples from extracellular space in the brain can be withdrawn from free moving or anesthetized animals and tested for glutamate using high-performance liquid chromatography (HPLC) (see, e.g., Chefer et al. *Curr Protoc Neurosci.* 2009; Chapter 7:Unit 7.1, which is incorporated by reference herein in its entirety). As another example, an electrochemical biosensor can be used to measure glutamate levels based on glutamate oxidase (GluOx) to generate $H_2O_2$, which is electrochemically detectable (see, e.g., Özel et al. *Biosens Bioelectron.* 2014; 15; 52:397-402, which is incorporated by reference herein in its entirety).

In some embodiments, an agent that increases the concentration of glutamate is selected from the group consisting of: D-glutamine, L-glutamine, L-alanine, D-alanine, D-cycloserine, N-methylglycine, L-serine, D-serine, N,N,N-trimethylglycine, 3-amino-1-hydroxypyrrolid-2-one, (R)—(N-[3-(4'-fluorophenyl)-3-{4'-phenylphenoxy)propyl]) sarcosine, N-methyl-N-[3-[(4-trilfluoromethyl)phenoxy]-3-phenyl-propyl]glycine, phosphatidylserine, vitamin C, and an allosteric positive modulator of an NMDA receptor such as a phenanthrene derivative, a naphthalene derivative, and a coumarin derivative.

Agents that Increase the Concentration of Brain-Derived Neurotrophic Factor (BDNF)

In some embodiments, a composition as described herein can comprise an agent that increases the concentration of brain-derived neurotrophic factor (BDNF). Many agents that increase the concentration of BDNF are known to one of skill in the art. For example, in some embodiments, an agent that increases the concentration of BDNF is an agent that upregulates CREB phosphorylation, which in turn leads to increased BDNF expression in the neurons. Non-limiting examples of an agent that increases the concentration of BDNF include resveratrol, vitamin E, a hydroxyflavan, epigallocatechin-3-gallate (EGCG), catechin, and epicatechin. Several methods for measuring BDNF concentration are also known to one of ordinary skill in the art. Non-limiting examples of such methods include: measuring BDNF mRNA using RT-PCR and/or measuring BDNF protein using immunoprecipitation (e.g., a Western blot) in a sample obtained from anesthetized animals or cell cultures of neurons as well as measuring BDNF protein levels serum/blood using immunoprecipitation (e.g., a Western blot) (see, e.g., Amadio et al. *Int. J. Mol Sci.* 2017; 18(9): 1987; Sleiman et al. *Elife.* 2016; 5. pii: e15092; and Polacchini et al. *Sci. Rep.* 2015; 5: 17989).

Acetylcholinesterase Signaling Modulators

In some embodiments, a composition as described herein can comprise an agent that affects acetylcholinesterase signaling. In some embodiments, a composition as described herein can comprise an acetylcholinesterase inhibitor. Many acetylcholinesterase inhibitors are known to one of skill in the art. Non-limiting examples of an acetylcholinesterase inhibitor include huperzine A, asiatic acid, luteolin, quercetin, rosmarinic acid, ursolic acid, and caffeic acid. Many methods are also known to one of ordinary skill in the art for measuring inhibition of an acetylcholinesterase activity. Non-limiting examples of a method for measuring inhibition of an acetylcholinesterase receptor include many commercially available acetylcholinesterase assay kits such as the Acetylcholinesterase Assay Kit ab138871 from Abcam, the QUANTICHROM™ Acetylcholinesterase Assay Kit from BioAssay Systems, and the Acetylcholinesterase Assay Kit from Abnova (Cat. No. KA1607). In some embodiments, phosphorylated (active) phospholipase C (PLC) can be used as a biomarker for acetylcholinesterase signaling. Non-limiting examples of methods to measure phosphorylated PLC include: measuring phosphorylated PLC using immunoprecipitation (e.g., a Western blot) in, for example, a cell lysate, and measuring phosphorylated PLC in intact cells by radiolabeling PLC and measuring it using x-ray radiography (see, e.g., Gomez-Cambronero. *Methods Mol. Biol.* 2003; 218:155-76, which is incorporated herein by reference in its entirety).

Terpenes or Terpenoids

As described herein, a "terpene" refers to a hydrocarbon having a general formula of $(C_5H_8)_n$. A "terpenoid" refers to a molecule derived from the modification (e.g., oxidation) of a terpene. Many terpenes and/or terpenoids are derived biosynthetically from units of isoprene. Non-limiting examples of a terpene and/or terpenoid include monoterpenes, diterpenes, triterpenes, hemiterpenes, sesquiterpenes, sesterterpenes, sesquarterpenes, and notisoprenoids. Further non-limiting examples of a terpene and/or terpenoid include aromadendrane-4β,10α-diol, asiatic acid, ursolic acid, huperzine A, and a terpenic lactone. Non-limiting examples of a terpenic lactone include onoseriolide, podoandin, 13-hydroxy-8,9-dehydroshizukanolide, and terpenic lactones extracted from *Gingko biloba* such as bilobalide or a gingkolide. In some embodiments, a gingkolide is a compound having the formula:

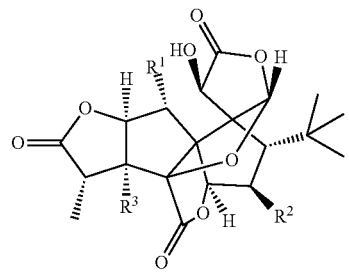

wherein $R^1$ is OH and $R^2$ is H (gingkolide B); $R^1$ is OH and $R^2$ is OH (gingkolide C); $R^1$ is H and $R^2$ is OH (gingkolide J); or $R^1$ is H and $R^2$ is H (gingkolide A). In some embodiments, the terpene or terpenoid is a terpenic lactone. In some embodiments, the terpene or terpenoid is a terpene or terpenoid that increases glutamate concentration. Non-limiting examples of a terpene or terpenoid that can increase glutamate concentration include a gingkolide. In some embodiments, the terpene or terpenoid is a terpene or terpenoid that inhibits acetylcholinesterase. Non-limiting examples of a terpene or terpenoid that inhibits acetylcholinesterase includes asiatic acid, ursolic acid, and huperzine A.

Amino Acids

As used herein, the term "amino acid" refers to naturally and non-naturally occurring L- and D-amino acids, peptidomimetic amino acids, and non-standard amino acids that are not made by a standard machinery or are only found in proteins after post-translational modification or as metabolic intermediates. Exemplary amino acids include, but are not limited to, arginine, alanine, asparagine, aspartic acid, cysteine, glutamic acid, glutamine, glycine, histidine, isoleucine, leucine, lysine, methionine, phenylalanine, proline, serine, threonine, tryptophan, tyrosine, valine, δ-aminolevulinic acid, 4-aminobenzoic acid, and γ-aminobutyric acid. In some embodiments, the amino acid is the L isomer. In some embodiments, the amino acid is the D isomer. In some embodiments, the amino acid is an α-amino acid. In some embodiments, the amino acid is a β-, γ-, or δ-amino acid. For example, a β-amino acid can be β-alanine, β-leucine, β-lysine, β-arginine, β-glutamate, β-glutamine, β-phenylalanine, and β-tyrosine. In some embodiments, the amino acid is an amino acid that increases glutamate concentration. Non-limiting examples of an amino acid that can increase glutamate concentration include D-glutamine, L-glutamine, L-alanine, D-alanine, D-cycloserine, N-methylglycine, L-serine, D-serine, N,N,N-trimethylglycine, 3-amino-1-hydroxypyrrolid-2-one, (R)—(N-[3-(4'-fluorophenyl)-3-{4'-phenylphenoxy)propyl])sarcosine, and N-methyl-N-[3-[(4-trilfluoromethyl)phenoxy]-3-phenyl-propyl]glycine.

In some embodiments, the amino acid is an amino acid that can increase dopamine production and/or is a dopamine precursor. An agent that increases dopamine production can include, for example, an aromatic amino acid and/or a dopamine precursor. Non-limiting examples of a dopamine precursor include phenylalanine, tyrosine, and L-DOPA.

Carboxylic Acids or Derivatives Thereof

As used herein a "carboxylic acid" refers to a compound containing a —COOH. Non-limiting examples of a carboxylic acid include caffeic acid, hydrocinnamic acid, and rosmarinic acid. Non-limiting examples of a carboxylic acid derivative include a ketoaldonic acid such as ascorbic acid (i.e., vitamin C) and sialic acid. As used herein, a "ketoaldonic acid" is an α-keto sugar acid. In some embodiments, the carboxylic acid or carboxylic acid derivative is a carboxylic acid or carboxylic acid derivative that increases glutamate concentration. Non-limiting examples of a carboxylic acid or carboxylic acid derivative that can increase glutamate concentration include vitamin C. In some embodiments, the carboxylic acid or carboxylic acid derivative is a carboxylic acid or carboxylic acid derivative that inhibits acetylcholinesterase. Non-limiting examples of a carboxylic acid that can inhibit acetylcholinesterase include caffeic acid, hydrocinnamic acid, and rosmarinic acid.

Phospholipids

As used herein, a "phospholipid" refers to a lipid that contains phosphorus. Non-limiting examples of phospholipids include phosphatidylserine. In some embodiments, the phospholipid can increase glutamate concentration. For example, a phospholipid, such as phosphatidylserine, can modulate AMPA and/or NMDA signaling.

Benzopyrans and Chromanols

As described herein, a "benzopyran" refers to a polycyclic organic compound comprising a benzene ring fused to a pyran ring. A "chromanol" refers to a molecule derived from the oxidation of a benzopyran. Non-limiting examples of a benzopyran include a chromane, an isochromane, a tocotrienol, and a tocopherol. In some embodiments, the benzopyran or chromanol is a tocopherol. Non-limiting examples of tocopherols include α-tocopherol, β-tocopherol, γ-tocopherol, and S-tocopherol. In some embodiments, the benzopyran or chromanol is a tocotrienol. Non-limiting examples of tocotrienols include α-tocotrienol, β-tocotrienol, γ-tocotrienol, and δ-tocotrienol. In some embodiments, the benzopyran or chromanol is a benzopyran or chromanol that can increase BDNF synthesis. Non-limiting examples of a benzopyran or chromanol that can increase BDNF synthesis include α-tocopherol, β-tocopherol, γ-tocopherol, δ-tocopherol, α-tocotrienol, β-tocotrienol, γ-tocotrienol, and δ-tocotrienol.

Polyphenols

As described herein, a "polyphenol" refers to an organic compound comprising two or more phenol structural units. Non-limiting examples of a polyphenol include resveratrol, hesperidin, catechin, epigallocatechin-3-gallate (EGCG), epicatechin, quercetin, and luteolin. In some embodiments, a polyphenol is also a flavone or flavan.

Flavans and Flavones

As described herein, a "flavan" refers to a polycyclic organic compound comprising a phenyl-benzopyran motif. Non-limiting examples of flavans include hydroxyflavans and flavan esters. In some embodiments, the flavan is a hydroxyflavan. Non-limiting examples of hydroxyflavans include catechin, epigallocatechin-3-gallate (EGCG), and epicatechin. In some embodiments, the flavan is flavan that can increase BDNF synthesis. Non-limiting examples of flavans that can increase BDNF synthesis include catechin, epigallocatechin-3-gallate (EGCG), and epicatechin.

As described herein, a "flavone" refers to a molecule derived from the oxidation of a flavan to form a phenyl-benzopyranone motif. Non-limiting examples of flavones include hydroxyflavones and flavone esters. In some embodiments, the flavone is a hydroxyflavone selected from the group consisting of: a trihydroxyflavone, a pentahydroxyflavone, and a tetrahydroxyflavone, and a combination thereof. Non-limiting examples of hydroxyflavones include quercetin and luteolin. In some embodiments, the flavone is a flavone that can inhibit acetylcholinesterase. Non-limiting examples of compounds that can inhibit acetylcholinesterase include quercetin and luteolin.

In some embodiments, a flavone or flavan is also a polyphenol.

Composition A

Also provided herein are compositions comprising two or more agents that increase the concentration of glutamate. In some embodiments, an agent that increases the concentration of glutamate includes one or more of: a terpene or terpenoid; an amino acid; a carboxylic acid or a carboxylic acid derivative; and a phospholipid.

Also provided herein are compositions comprising two or more of: a terpene or terpenoid; an amino acid; a carboxylic acid or a carboxylic acid derivative; and a phospholipid. In some embodiments, the composition comprises a terpene or terpenoid and a phospholipid. In some embodiments, the composition comprises a terpene or terpenoid, a phospholipid, and an amino acid. In some embodiments, the composition comprises a terpene or terpenoid, a phospholipid, and a carboxylic acid or a carboxylic acid derivative. In some embodiments, the composition comprises a terpene or terpenoid, a phospholipid, a terpene or terpenoid, and a carboxylic acid or a carboxylic acid derivative.

In some embodiments, the terpene or terpenoid is present in an amount of about 0.01% to about 50% w/w of the composition. For example, about 0.01% to about 5%, about 0.01% to about 10%, about 0.01% to about 15%, about 0.01% to about 20%, about 0.01%, to about 25%, about 0.01%, to about 30%, about 0.01%, to about 35%, about 0.01%, to about 40%, about 0.01%, to about 45%, about 50% to about 45%, about 50% to about 40%, about 50% to about 35%, about 50% to about 30%, about 50% to about 25%, about 50% to about 20%, about 50% to about 15%, about 50% to about 10%, or about 50% to about 5% w/w of the composition. In some embodiments, the terpene or terpenoid is present in an amount of about 0.01% to about 10% or about 0.1% to about 10% w/w of the composition. For example, about 0.01%, about 0.5%, about 1%, about 1.5%, about 2%, about 2.5%, about 3%, about 3.5%, about 4%, about 4.5%, about 5%, about 5.5%, about 6%, about 6.5%, about 7%, about 7.5%, about 8%, about 8.5%, about 9%, about 9.5%, or about 10% w/w of the composition. In some embodiments, the terpene or terpenoid is a terpene or terpenoid that increases glutamate concentration.

In some embodiments, the terpene or terpenoid is present in an amount of about 0.01% to about 2% w/w of the composition. For example, about 0.01% to about 0.1%, about 0.01% to about 0.2%, about 0.01% to about 0.3%, about 0.01% to about 0.4%, about 0.01%, to about 0.5%, about 0.01%, to about 0.6%, about 0.01%, to about 0.7%, about 0.01%, to about 0.8%, about 0.01%, to about 0.9%, about 0.01% to about 1%, about 0.01% to about 1.5%, about 1.5% to about 2%, about 1% to about 2%, or about 0.05% to about 2% w/w of the composition. In some embodiments, the terpene or terpenoid is present in an amount of about 0.1% to about 0.2%, about 0.15% to about 0.25%, about 0.2% to about 0.25%, about 0.2% to about 0.3%, about 0.22% to about 0.27%, about 0.25% to about 0.30%, about 0.25% to about 0.35%, or about 0.3% to about 0.4% w/w of the composition. For example, about 0.15%, about 0.16%, about 0.17%, about 0.18%, about 0.19%, about 0.2%, about 0.21%, about 0.22%, about 0.23%, about 0.24%, about 0.25%, about 0.26%, about 0.27%, about 0.28%, about 0.29%, about 0.3%, about 0.31%, about 0.32%, about 0.33%, about 0.34%, or about 0.35% w/w of the composition. In some embodiments, the terpene or terpenoid is a terpene or terpenoid that increases glutamate concentration.

In some embodiments, the terpene or terpenoid is selected from the group consisting of: aromadendrane-4β,10α-diol, asiatic acid, ursolic acid, huperzine A, onoseriolide, podoandin, 13-hydroxy-8,9-dehydroshizukanolide, ginkgolide B, ginkgolide A, ginkgolide J, ginkgolide C, ginkgolide J, and a combination thereof. In some embodiments, the terpene or terpenoid comprises a terpeneic lactone. In some embodiments, the terpene or terpenoid is a terpenic lactone. In some embodiments, the terpenic lactone is selected from the group consisting of: ginkgolide B, ginkgolide A, ginkgolide J, ginkgolide C, ginkgolide J, and a combination thereof.

In some embodiments, the terpene or terpenoid comprises ginkgolide B. In some embodiments, the terpene or terpenoid is ginkgolide B. In some embodiments, ginkgolide B is present in an amount of about 0.01% to about 50% w/w of the composition. For example, about 0.01% to about 5%, about 0.01% to about 10%, about 0.01% to about 15%, about 0.01% to about 20%, about 0.01%, to about 25%, about 0.01%, to about 30%, about 0.01%, to about 35%, about 0.01%, to about 40%, about 0.01%, to about 45%, about 50% to about 45%, about 50% to about 40%, about 50% to about 35%, about 50% to about 30%, about 50% to about 25%, about 50% to about 20%, about 50% to about 15%, about 50% to about 10%, or about 50% to about 5% w/w of the composition. In some embodiments, ginkgolide B is present in an amount of about 0.01% to about 10% or about 0.1% to about 10% w/w of the composition. For example, about 0.01%, about 0.5%, about 1%, about 1.5%, about 2%, about 2.5%, about 3%, about 3.5%, about 4%, about 4.5%, about 5%, about 5.5%, about 6%, about 6.5%, about 7%, about 7.5%, about 8%, about 8.5%, about 9%, about 9.5%, or about 10% w/w of the composition.

In some embodiments, ginkgolide B is present in an amount of about 0.01% to about 2% w/w of the composition. For example, about 0.01% to about 0.1%, about 0.01% to about 0.2%, about 0.01% to about 0.3%, about 0.01% to about 0.4%, about 0.01%, to about 0.5%, about 0.01%, to about 0.6%, about 0.01%, to about 0.7%, about 0.01%, to about 0.8%, about 0.01%, to about 0.9%, about 0.01%, to about 1%, about 0.01% to about 1.5%, about 1.5% to about 2%, about 1% to about 2%, or about 0.05% to about 2% w/w of the composition. In some embodiments, ginkgolide B is present in an amount of about 0.1% to about 0.2%, about 0.15% to about 0.25%, about 0.2% to about 0.25%, about 0.2% to about 0.3%, about 0.22% to about 0.27%, about 0.25% to about 0.30%, about 0.25% to about 0.35%, or about 0.3% to about 0.4% w/w of the composition. For example, about 0.15%, about 0.16%, about 0.17%, about 0.18%, about 0.19%, about 0.2%, about 0.21%, about 0.22%, about 0.23%, about 0.24%, about 0.25%, about 0.26%, about 0.27%, about 0.28%, about 0.29%, about 0.3%, about 0.31%, about 0.32%, about 0.33%, about 0.34%, or about 0.35% w/w of the composition.

In some embodiments, the amino acid is present in an amount of about 5% to about 50% w/w of the composition. For example, about 5% to about 10%, about 5% to about 15%, about 5% to about 20%, about 5% to about 25%, about 5% to about 30%, about 5% to about 35%, about 5% to about 40%, about 5% to about 45%, about 45% to about 50%, about 40% to about 50%, about 35% to about 50%, about 30% to about 50%, about 25% to about 50%, about 20% to about 50%, about 15% to about 50%, or about 10% to about w/w of the composition. In some embodiments, the amino acid is present in an amount of about 10% to about 40%, about 10% to about 30%, about 30% to about 40%, or about 20% to about 40% w/w of the composition. In some embodiments, the amino acid is present in an amount of about 10% to about 15%, about 15% to about 25%, about 15% to about 20%, about 20% to about 25%, about 20% to about 30%, about 25% to about 30%, about 30% to about 40%, or about 30% to about 35% w/w of the composition. For example, about 20% to about 21%, about 20.5% to about 21.5%, about 21% to about 22%, about 21.5% to about 22.5%, about 23% to about 24%, about 23.5% to about 24.5%, about 24% to about 25%, about 24.5% to about 25.5%, about 25% to about 26%, about 25.5% to about 26.5%, about 26 to about 27%, about 26.5% to about 27.5%, about 27% to about 28%, about 27.5% to about 28.5%, about 28% to about 29%, about 28.5% to about 29.5%, or about 29% to about 30% w/w of the composition. In some embodiments, the amino acid is present in an amount of about 20%, about 21%, about 22%, about 23%, about 23.5%, about 24%, about 24.2%, about 24.4%, about 24.6%, about 24.8%, about 25%, about 25.5%, about 26%, about 27%, about 28%, about 29%, or about 30% w/w of the composition. In some embodiments, the amino acid is an amino acid that increases glutamate concentration.

In some embodiments, the amino acid is selected from the group consisting of: D-glutamine, L-glutamine, L-alanine, D-alanine, D-cycloserine, N-methylglycine, L-serine, D-serine, N,N,N-trimethylglycine, 3-amino-1-hydroxypyrrolid-2-one, (R)—(N-[3-(4'-fluorophenyl)-3-{4'-phenylphenoxy)propyl])sarcosine, N-methyl-N-[3-[(4-trilfluoromethyl)phenoxy]-3-phenyl-propyl]glycine, and a combination thereof. In some embodiments, the amino acid is an α-amino acid. In some embodiments, the amino acid is selected from the group consisting of: D-glutamine, L-glutamine, and a combination thereof.

In some embodiments, the amino acid comprises D-glutamine. In some embodiments, the amino acid is D-glutamine. In some embodiments, D-glutamine is present in an amount of about 5% to about 50% w/w of the composition. For example, about 5% to about 10%, about 5% to about 15%, about 5% to about 20%, about 5% to about 25%, about 5% to about 30%, about 5% to about 35%, about 5% to about 40%, about 5% to about 45%, about 45% to about 50%, about 40% to about 50%, about 35% to about 50%, about 30% to about 50%, about 25% to about 50%, about 20% to about 50%, about 15% to about 50%, or about 10% to about w/w of the composition. In some embodiments, D-glutamine is present in an amount of about 10% to about 40%, about 10% to about 30%, about 30% to about 40%, or about 20% to about 40% w/w of the composition. In some embodiments, D-glutamine is present in an amount of about 10% to about 15%, about 15% to about 25%, about 15% to about 20%, about 20% to about 25%, about 20% to about 30%, about 25% to about 30%, about 30% to about 40%, or about 30% to about 35% w/w of the composition. For example, about 20% to about 21%, about 20.5% to about 21.5%, about 21% to about 22%, about 21.5% to about 22.5%, about 23% to about 24%, about 23.5% to about 24.5%, about 24% to about 25%, about 24.5% to about 25.5%, about 25% to about 26%, about 25.5% to about 26.5%, about 26 to about 27%, about 26.5% to about 27.5%, about 27% to about 28%, about 27.5% to about 28.5%, about 28% to about 29%, about 28.5% to about 29.5%, or about 29% to about 30% w/w of the composition. In some embodiments, D-glutamine is present in an amount of about 20%, about 21%, about 22%, about 23%, about 23.5%, about 24%, about 24.2%, about 24.4%, about 24.6%, about 24.8%, about 25%, about 25.5%, about 26%, about 27%, about 28%, about 29%, or about 30% w/w of the composition.

In some embodiments, the carboxylic acid or carboxylic acid derivative is present in an amount of about 0.01% to about 50% w/w of the composition. For example, about 0.01% to about 5%, about 0.01% to about 10%, 0.01% to about 1.%, about 0.01% to about 20%, about 0.01% to about 25%, about 0.01% to about 30%, about 0.01% to about 35%, about 0.01% to about 40%, about 0.01% to about 45%, about 45% to about 50%, about 40% to about 50%, about 30% to about 50%, about 25% to about 50%, about 20% to about 50%, about 15% to about 50%, about 10% to about 50%, or about 5% to about 50% w/w of the composition. In some embodiments, the carboxylic acid or carboxylic acid derivative is present in an amount of 0.05% to about 30% or about 0.1% to about 10% w/w of the composition. For example, about 1%, about 2%, about 3%, about 4%, about 5%, about 6%, about 7%, about 8%, about 9%, or about 10% w/w of the composition.

In some embodiments, the carboxylic acid or carboxylic acid derivative is present in an amount of about 0.1% to about 5% w/w of the composition. For example, about 0.1% to about 0.5%, about 0.1% to about 1%, 0.1% to about 1.5%, about 0.1% to about 2%, about 0.1% to about 2.5%, about 0.1% to about 3%, about 0.1% to about 3.5%, about 0.1% to about 4%, about 4% to about 5%, about 3% to about 5%, about 2.5% to about 5%, about 2% to about 5%, about 1.5% to about 5%, or about 1% to about 5% w/w of the composition. In some embodiments, the carboxylic acid or carboxylic acid derivative is present in an amount of 0.5% to about 2.5% w/w of the composition. For example, about 0.5% to about 1%, about 0.8% to about 1.2%, about 1% to about 1.5%, about 1.2% to about 1.7%, about 1.5% to about 2%, about 1.7% to about 2.2%, or about 2% to about 2.5% w/w of the composition. In some embodiments, the carboxylic acid or carboxylic acid derivative is present in an amount of 1% to about 2% w/w of the composition. For example, about 1%, about 1.1%, about 1.2%, about 1.3%, about 1.4%, about 1.48%, about 1.5%, about 1.6%, about 1.7%, about 1.8%, about 1.9%, or about 2% w/w of the composition.

In some embodiments, the carboxylic acid or carboxylic acid derivative is a ketoaldonic acid. In some embodiments, the carboxylic acid or carboxylic acid derivative is selected from the group consisting of: ascorbic acid, an ascorbate, dehydroascorbic acid, dehydroascorbate, and a combination thereof.

In some embodiments, the carboxylic acid or carboxylic acid derivative comprises ascorbic acid. In some embodiments, the carboxylic acid or carboxylic acid derivative is ascorbic acid. In some embodiments, ascorbic acid is present in an amount of about 0.01% to about 50% w/w of the composition. For example, about 0.01% to about 5%, about 0.01% to about 10%, 0.01% to about 1.%, about 0.01% to about 20%, about 0.01% to about 25%, about 0.01% to about 30%, about 0.01% to about 35%, about 0.01% to about 40%, about 0.01% to about 45%, about 45% to about 50%, about 40% to about 50%, about 30% to about 50%, about 25% to about 50%, about 20% to about 50%, about 15% to about 50%, about 10% to about 50%, or about 5% to about 50% w/w of the composition. In some embodiments, ascorbic acid is present in an amount of 0.05% to about 30% or about 0.1% to about 10% w/w of the composition. For example, about 1%, about 2%, about 3%, about 4%, about 5%, about 6%, about 7%, about 8%, about 9%, or about 10% w/w of the composition.

In some embodiments, ascorbic acid is present in an amount of about 0.1% to about 5% w/w of the composition. For example, about 0.1% to about 0.5%, about 0.1% to about 1%, 0.1% to about 1.5%, about 0.1% to about 2%, about 0.1% to about 2.5%, about 0.1% to about 3%, about 0.1% to about 3.5%, about 0.1% to about 4%, about 4% to about 5%, about 3% to about 5%, about 2.5% to about 5%, about 2% to about 5%, about 1.5% to about 5%, or about 1% to about 5% w/w of the composition. In some embodiments, ascorbic acid is present in an amount of 0.5% to about 2.5% w/w of the composition. For example, about 0.5% to about 1%, about 0.8% to about 1.2%, about 1% to about 1.5%, about 1.2% to about 1.7%, about 1.5% to about 2%, about 1.7% to about 2.2%, or about 2% to about 2.5% w/w of the composition. In some embodiments, ascorbic acid is present in an amount of 1% to about 2% of the composition. For example, about 1%, about 1.1%, about 1.2%, about 1.3%, about 1.4%, about 1.48%, about 1.5%, about 1.6%, about 1.7%, about 1.8%, about 1.9%, or about 2% w/w of the composition.

In some embodiments, the phospholipid is present in an amount of about 10% to about 90% w/w of the composition. For example, about 10% to about 20%, about 10% to about 30%, about 10% to about 40%, about 10% to about 50%, about 10% to about 60%, about 10% to about 70%, about 10% to about 80%, about 80% to about 90%, about 70% to about 90%, about 60% to about 90%, about 50% to about 90%, about 40% to about 90%, about 30% to about 90%, or about 20% to about 90% w/w of the composition. In some embodiments, the phospholipid is present in an amount of about 30% to about 85% or about 60% to about 80% w/w of the composition. For example, about 55%, about 57%, about 60%, about 62%, about 65%, about 67%, about 70%, about 72%, about 75%, about 77%, or about 80% w/w of the composition.

In some embodiments, the phospholipid is present in an amount of about 50% to about 90% w/w of the composition. For example, about 50% to about 60%, about 50% to about 70%, about 50% to about 80%, about 80% to about 90%, about 70% to about 90%, about 60% to about 90%, about 55% to about 65%, about 60% to about 70%, about 65% to about 75%, about 70% to about 80%, or about 75% to about 85% w/w of the composition. In some embodiments, the phospholipid is present in an amount of about 65% to about 80% w/w of the composition. For example, about 65% to about 67%, about 66% to about 68%, about 67% to about 69%, about 68% to about 70%, about 69% to about 71%, about 70% to about 72%, about 71% to about 73%, about 72% to about 74%, about 73% to about 75%, about 74% to about 76%, 75% to about 77%, about 76% to about 78%, about 77% to about 79%, or about 78% to about 80% w/w of the composition. In some embodiments, the phospholipid is present in an amount of about 65%, about 66%, about 67%, about 68%, about 69%, about 70%, about 71%, about 72%, about 73%, about 73.2%, about 73.4%, about 73.6%, about 73.7%, about 73.8%, about 74%, about 75%, about 76%, about 77%, about 78%, about 79%, about 80% w/w of the composition.

In some embodiments, the phospholipid comprises phosphatidylserine. In some embodiments, the phospholipid is phosphatidylserine. In some embodiments, phosphatidylserine is present in an amount of about 10% to about 90% w/w of the composition. For example, about 10% to about 20%, about 10% to about 30%, about 10% to about 40%, about 10% to about 50%, about 10% to about 60%, about 10% to about 70%, about 10% to about 80%, about 80% to about 90%, about 70% to about 90%, about 60% to about 90%, about 50% to about 90%, about 40% to about 90%, about 30% to about 90%, or about 20% to about 90% w/w of the composition. In some embodiments, phosphatidylserine is present in an amount of about 30% to about 85% or about 60% to about 80% w/w of the composition. For example, about 55%, about 57%, about 60%, about 62%, about 65%, about 67%, about 70%, about 72%, about 75%, about 77%, or about 80% w/w of the composition.

In some embodiments, phosphatidylserine is present in an amount of about 50% to about 90% w/w of the composition. For example, about 50% to about 60%, about 50% to about 70%, about 50% to about 80%, about 80% to about 90%, about 70% to about 90%, about 60% to about 90%, about 55% to about 65%, about 60% to about 70%, about 65% to about 75%, about 70% to about 80%, or about 75% to about 85% w/w of the composition. In some embodiments, phosphatidylserine is present in an amount of about 65% to about 80% w/w of the composition. For example, about 65% to about 67%, about 66% to about 68%, about 67% to about 69%, about 68% to about 70%, about 69% to about 71%, about 70% to about 72%, about 71% to about 73%, about 72% to about 74%, about 73% to about 75%, about 74% to about 76%, 75% to about 77%, about 76% to about 78%, about 77% to about 79%, or about 78% to about 80% w/w of the composition. In some embodiments, phosphatidylserine is present in an amount of about 65%, about 66%, about 67%, about 68%, about 69%, about 70%, about 71%, about 72%, about 73%, about 73.2%, about 73.4%, about 73.6%, about 73.7%, about 73.8%, about 74%, about 75%, about 76%, about 77%, about 78%, about 79%, about 80% w/w of the composition.

In some embodiments, a composition as described herein can further include a dopamine precursor. In some embodiments, the dopamine precursor is present in an amount of about 0.5% to about 50% w/w of the composition. For example, about 0.5% to about 1%, about 0.5% to about 5%, about 0.5% to about 10%, about 0.5% to about 20%, about 0.5% to about 30%, about 0.05% to about 40%, about 40% to about 50%, about 30% to about 50%, about 20% to about 50%, or about 10% to about 50% w/w of the composition. In some embodiments, the dopamine precursor is present in an amount of 1% to about 10%, about 5% to about 15%, about 10% to about 20%, about 10% to about 40%, about 15% to about 25%, about 20% to about 30%, about 25% to about 35%, or about 30% to about 40% w/w of the composition. For example, about 20% about 21%, about 22%, about 23%, about 24%, about 25%, about 26%, about 27%, about 28%, about 29%, or about 30% w/w of the composition.

In some embodiments, the dopamine precursor is tyrosine. In some embodiments, tyrosine is present in an amount of about 0.5% to about 50% w/w of the composition. For example, about 0.5% to about 1%, about 0.5% to about 5%, about 0.5% to about 10%, about 0.5% to about 20%, about 0.5% to about 30%, about 0.05% to about 40%, about 40% to about 50%, about 30% to about 50%, about 20% to about 50%, or about 10% to about 50% w/w of the composition. In some embodiments, tyrosine is present in an amount of 1% to about 10%, about 5% to about 15%, about 10% to about 20%, about 10% to about 40%, about 15% to about 25%, about 20% to about 30%, about 25% to about 35%, or about 30% to about 40% w/w of the composition. For example, about 20% about 21%, about 22%, about 23%, about 24%, about 25%, about 26%, about 27%, about 28%, about 29%, or about 30% w/w of the composition.

In some embodiments, the composition comprises or consists essentially of: an amino acid present in an amount of about 20% to about 30% w/w of the composition; a terpene or terpenoid present in an amount of about 0.1% to about 0.4% w/w of the composition; and a phospholipid present in an amount of about 65% to about 80% w/w of the composition.

In some embodiments, the composition comprises or consists essentially of: a terpene or terpenoid present in an amount of about 0.1% to about 0.4% w/w of the composition; a phospholipid present in an amount of about 65% to about 80% w/w of the composition; and a carboxylic acid or carboxylic acid derivative present in an amount of about 0.5% to about 2.5% w/w of the composition.

In some embodiments, the composition comprises or consists essentially of: an amino acid present in an amount of about 20% to about 30% w/w of the composition; a terpene or terpenoid present in an amount of about 0.1% to about 0.4% w/w of the composition; a phospholipid present in an amount of about 65% to about 80% w/w of the composition; and a carboxylic acid or carboxylic acid derivative present in an amount of about 0.5% to about 2.5% w/w of the composition.

Also provided herein are compositions comprising two or more of: ginkgolide B; D-glutamine; ascorbic acid; and phosphatidylserine. In some embodiments, the composition comprises ginkgolide B and phosphatidylserine. In some embodiments, the composition comprises ginkgolide B, phosphatidylserine, and D-glutamine. In some embodiments, the composition comprises ginkgolide B, phosphatidylserine, and ascorbic acid. In some embodiments, the composition comprises D-glutamine, phosphatidylserine, ginkgolide B, and ascorbic acid.

In some embodiments, the composition comprises or consists essentially of: ginkgolide B present in an amount of about 0.1% to about 0.4% w/w of the composition; phosphatidylserine present in an amount of about 65% to about 80% w/w of the composition; and ascorbic acid present in an amount of about 0.5% to about 2.5% w/w of the composition.

In some embodiments, the composition comprises or consists essentially of: D-glutamine present in an amount of about 20% to about 30% w/w of the composition; phosphatidylserine present in an amount of about 65% to about 80% w/w of the composition; and ascorbic acid present in an amount of about 0.5% to about 2.5% w/w of the composition.

In some embodiments, the composition comprises or consists essentially of: D-glutamine present in an amount of about 20% to about 30% w/w of the composition; ginkgolide B present in an amount of about 0.1% to about 0.4% w/w of the composition; and ascorbic acid present in an amount of about 0.5% to about 2.5% w/w of the composition.

In some embodiments, the composition comprises or consists essentially of: D-glutamine present in an amount of about 20% to about 30% w/w of the composition; ginkgolide B present in an amount of about 0.1% to about 0.4% w/w of the composition; and phosphatidylserine present in an amount of about 65% to about 80% w/w of the composition.

In some embodiments, the composition comprises: or consists essentially of D-glutamine present in an amount of about 20% to about 30% w/w of the composition; ginkgolide B present in an amount of about 0.1% to about 0.4% w/w of the composition; phosphatidylserine present in an amount of about 65% to about 80% w/w of the composition; and ascorbic acid present in an amount of about 0.5% to about 2.5% w/w of the composition.

In some embodiments, the composition comprises or consists essentially of: D-glutamine present in an amount of about 24.6% w/w of the composition; ginkgolide B present in an amount of about 0.25% w/w of the composition; phosphatidylserine present in an amount of about 73.7% w/w of the composition; and ascorbic acid present in an amount of about 1.5% w/w of the composition.

In some of any of the above embodiments, the composition further comprises one or more excipients, diluents, or carriers.

Composition A can be formulated for oral delivery in a variety of ways. For example, the composition can be in the form of a tablet or powder. As another example, Composition A can be in the form of a liquid, solution, suspension, gummy, tablet, powder, soft gelatin capsules, or hard gelatin capsules. Commercial dietary supplements are generally formulated for oral administration. For oral administration, tablets or capsules can be prepared by conventional means with pharmaceutically acceptable excipients such as binding agents, fillers, lubricants, disintegrants, or wetting agents. The tablets can be coated by methods known in the art. Liquid preparations for oral administration can take the form of, for example, solutions, syrups, or suspension, or they can be presented as a dry product for constitution with saline or other suitable liquid vehicle before use. For example, Composition A can be presented as dry powder and dissolved in a suitable liquid carrier. In some embodiments, Composition A can be diluted in a suitable liquid carrier. I some embodiments, Composition A is diluted in an energy drink. In some embodiments, liquid preparations also can contain pharmaceutically acceptable additives such as suspending agents, emulsifying agents, non-aqueous vehicles, preservatives, buffer salts, flavoring agents, coloring agents, and sweetening agents as appropriate. In some embodiments, composition A can be presented as a stick pack. Preparations for oral administration can be suitably formulated to give controlled release of the compound.

Tablets and powders can be configured to have a unit dosage equal to the daily desired dosage. For example, if a subject desires 1000 mg of a particular composition, each tablet can be 1000 mg in weight. As another example, if a subject desires 1000 mg of a particular composition each tablet can be 500 mg in weight and the subject can take two tablets. The dosages of a particular composition will depend on many factors including the mode of administration. As an example, Composition A can be formulated in a dose such that an individual receives the amounts as shown in Table 1, e.g., in a single tablet, divided among 2 or more tablets, or as a powder.

TABLE 1

| Components | Dosage Amount (mg) |
|---|---|
| D-glutamine | 83.6 |
| ginkgolide B | 0.84 |
| phosphatidylserine | 250 |
| vitamin C | 5 |

In addition, a composition provided herein can contain a pharmaceutically acceptable carrier for in vivo administration to a subject. Such pharmaceutically acceptable carriers include, without limitation, sterile aqueous or non-aqueous solutions, suspensions, and emulsions. Examples of non-aqueous solvents include, without limitation, propylene glycol, polyethylene glycol, vegetable oils, and injectable organic esters. Aqueous carriers include water, alcohol, saline, and buffered solutions. Pharmaceutically acceptable carriers also can include physiologically acceptable aqueous vehicles (e.g., physiological saline) or other known carriers appropriate to specific routes of administration. Preservatives, flavorings, and other additives such as, for example, proteins, anti-microbials, chelating agents, inert gases, and the like also can be present in a composition.

Composition B

Also provided herein are compositions comprising: one or more agents that increase brain-derived neurotrophic factor (BDNF); and one or more NMDA and/or AMPA receptor modulators. In some embodiments, the one or more agents that increase brain-derived neurotrophic factor (BDNF) synthesis modulate CREB. In some embodiments, the one or more agents that increase brain-derived neurotrophic factor (BDNF) are selected from the group consisting of: a benzopyran and/or a chromanol; and a flavone. In some embodiments, the one or more NMDA and/or AMPA receptor modulators comprises a phospholipid.

Also provided herein are compositions comprising one or more of: a benzopyran or chromanol; a flavone; and a phospholipid. In some embodiments, the composition comprises a benzopyran or chromanol; and a flavone. In some embodiments, the composition comprises a benzopyran or chromanol; and a phospholipid. In some embodiments, the composition comprises a flavone; and a phospholipid. In some embodiments, the composition comprises a benzopyran or chromanol; a flavone; and a phospholipid.

In some embodiments, the benzopyran or chromanol is present in an amount of about 10% to about 90% w/w of the composition. For example, about 10% to about 20%, about 10% to about 30%, about 10% to about 40%, about 10% to about 50%, about 10% to about 60%, about 10% to about 70%, about 10% to about 80%, about 80% to about 90%, about 70% to about 90%, about 60% to about 90%, about 50% to about 90%, about 40% to about 90%, about 30% to about 90%, or about 20% to about 90% w/w of the composition. In some embodiments, the benzopyran or chromanol is present in an amount of about 20% to about 70%, about 30% to about 60%, about 40% to about 50%, about 45% to about 55%, about 50% to about 60%, about 55% to about 60%, about 53% to about 58%, about 55% to about 57%, about 55% to about 65%, about 60% to about 70%, or about 65% to about 75% w/w of the composition. For example, about 45%, about 46%, about 47%, about 48%, about 49%, about 50%, about 51%, about 52%, about 53%, about 54%, about 55%, about 56%, about 57%, about 58%, about 59%, or about 60% w/w of the composition. In some embodiments, the benzopyran or chromanol is a benzopyran or chromanol that enhances BDNF synthesis.

In some embodiments, the benzopyran or chromanol comprises a tocopherol. In some embodiments, the benzopyran or chromanol is a tocopherol. In some embodiments, the tocopherol is selected from the group consisting of: α-tocopherol, β-tocopherol, γ-tocopherol, and δ-tocopherol, and a combination thereof. In some embodiments, the benzopyran or chromanol comprises a tocotrienol. In some embodiments, the benzopyran or chromanol is a tocotrienol. In some embodiments, the tocotrienol is selected from the group consisting of: α-tocotrienol, β-tocotrienol, γ-tocotrienol, and δ-tocotrienol, and a combination thereof. In some embodiments, the benzopyran or chromanol comprises a combination of tocopherols and tocotrienols. In some embodiments, the benzopyran or chromanol is a combination of tocopherols and tocotrienols. In some embodiments, the combination of tocopherols and tocotrienols comprises at least two compounds selected from the group consisting of: α-tocopherol, β-tocopherol, γ-tocopherol, δ-tocopherol, α-tocotrienol, β-tocotrienol, γ-tocotrienol, and δ-tocotrienol.

In some embodiments, the benzopyran or chromanol comprises vitamin E. In some embodiments, the benzopyran or chromanol is vitamin E. "Vitamin E" as referred to herein includes any one of α-tocopherol, β-tocopherol, γ-tocopherol, δ-tocopherol, α-tocotrienol, β-tocotrienol, γ-tocotrienol, and δ-tocotrienol or any combination thereof. In some embodiments, vitamin E is present in an amount of about 10% to about 90% w/w of the composition. For example, about 10% to about 20%, about 10% to about 30%, about 10% to about 40%, about 10% to about 50%, about 10% to about 60%, about 10% to about 70%, about 10% to about 80%, about 80% to about 90%, about 70% to about 90%, about 60% to about 90%, about 50% to about 90%, about 40% to about 90%, about 30% to about 90%, or about 20% to about 90% w/w of the composition. In some embodiments, vitamin E is present in an amount of about 20% to about 70%, about 30% to about 60%, about 40% to about 50%, about 45% to about 55%, about 50% to about 60%, about 55% to about 60%, about 53% to about 58%, about 55% to about 57%, about 55% to about 65%, about 60% to about 70%, or about 65% to about 75% w/w of the composition. For example, about 45%, about 46%, about 47%, about 48%, about 49%, about 50%, about 51%, about 52%, about 53%, about 54%, about 55%, about 56%, about 57%, about 58%, about 59%, or about 60% w/w of the composition. In some embodiments, vitamin E is α-tocopherol.

In some embodiments, the flavan is present in an amount of about 1% to about 60% w/w of the composition. For example, about 1% to about 10%, about 1% to about 20%, about 1% to about 30%, about 1% to about 40%, about 1% to about 50%, about 50% to about 60%, about 40% to about 60%, about 30% to about 60%, about 20% to about 60%, or about 10% to about 60% w/w of the composition. In some embodiments, the flavan is present in an amount of about 5% to about 40% or about 10% to about 20% w/w of the composition. In some embodiments, the flavan is a flavan that enhances BDNF synthesis.

In some embodiments, the flavan is present in an amount of about 5% to about 30% w/w of the composition. For example, about 5% to about 10%, about 5% to about 15%, about 5% to about 20%, about 5% to about 25%, about 25% to about 30%, about 20% to about 30%, about 15% to about 30%, or about 10% to about 30% w/w of the composition. In some embodiments, the flavan is present in an amount of about 5% to about 20%, about 10% to about 25%, about 10% to about 20%, about 12% to about 20%, about 14% to about 18%, or about 15% to about 17% w/w of the composition. For example, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, or about 25% w/w of the composition. In some embodiments, the flavan is a flavan that enhances BDNF synthesis.

In some embodiments, the flavan comprises a hydroxyflavan. In some embodiments, the flavan is a hydroxyflavan. In some embodiments, the hydroxyflavan is selected from the group consisting of: epigallocatechin-3-gallate (EGCG), catechin, epicatechin, and a combination thereof.

In some embodiments, the flavan comprises epicatechin. In some embodiments, the flavan is epicatechin. In some embodiments, epicatechin is present in an amount of about 1% to about 60% w/w of the composition. For example, about 1% to about 10%, about 1% to about 20%, about 1% to about 30%, about 1% to about 40%, about 1% to about 50%, about 50% to about 60%, about 40% to about 60%, about 30% to about 60%, about 20% to about 60%, or about 10% to about 60% w/w of the composition. In some embodiments, epicatechin is present in an amount of about 5% to about 40% or about 10% to about 20% w/w of the composition.

In some embodiments, epicatechin is present in an amount of about 5% to about 30% w/w of the composition. For example, about 5% to about 10%, about 5% to about 15%, about 5% to about 20%, about 5% to about 25%, about 25% to about 30%, about 20% to about 30%, about 15% to about 30%, or about 10% to about 30% w/w of the composition. In some embodiments, epicatechin is present in an amount of about 5% to about 20%, about 10% to about 25%, about 10% to about 20%, about 12% to about 20%, about 14% to about 18%, or about 15% to about 17% w/w of the composition. For example, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, or about 25% w/w of the composition.

In some embodiments, the flavan comprises EGCG. In some embodiments, the flavan is EGCG. In some embodiments, EGCG is present in an amount of about 1% to about 60% w/w of the composition. For example, about 1% to about 10%, about 1% to about 20%, about 1% to about 30%, about 1% to about 40%, about 1% to about 50%, about 50% to about 60%, about 40% to about 60%, about 30% to about 60%, about 20% to about 60%, or about 10% to about 60% w/w of the composition. In some embodiments, EGCG is present in an amount of about 5% to about 40% or about 10% to about 20% w/w of the composition.

In some embodiments, EGCG is present in an amount of about 5% to about 30% w/w of the composition. For example, about 5% to about 10%, about 5% to about 15%, about 5% to about 20%, about 5% to about 25%, about 25% to about 30%, about 20% to about 30%, about 15% to about 30%, or about 10% to about 30% w/w of the composition. In some embodiments, EGCG is present in an amount of about 5% to about 20%, about 10% to about 25%, about 10% to about 20%, about 12% to about 20%, about 14% to about 18%, or about 15% to about 17% w/w of the composition. For example, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, or about 25% w/w of the composition.

In some embodiments, the phospholipid is present in an amount of about 5% to about 70% w/w of the composition.

For example, about 5% to about 10%, about 5% to about 20%, about 5% to about 30%, about 5% to about 40%, about 5% to about 50%, about 5% to about 60%, about 60% to about 70%, about 50% to about 70%, about 40% to about 70%, about 30% to about 70%, about 20% to about 70%, about 10% to about 70% w/w of the composition. In some embodiments, the phospholipid is present in an amount of about 10% to about 60%, about 20% to about 40%, about 20% to about 30%, about 25% to about 35%, or about 30% to about 40% w/w of the composition. In some embodiments, the phospholipid is present in an amount of about 20% to about 25%, about 22% to about 27%, about 25% to about 30%, or about 27% to about 32% w/w of the composition. For example, about 20%, about 21%, about 22%, about 23%, about 24%, about 25%, about 26%, about 27%, about 28%, about 29%, about 30%, about 31%, about 32%, about 32%, about 33%, about 34%, or about 35% w/w of the composition.

In some embodiments, the phospholipid comprises phosphatidylserine. In some embodiments, the phospholipid is phosphatidylserine. In some embodiments, phosphatidylserine is present in an amount of about 5% to about 70% w/w of the composition. For example, about 5% to about 10%, about 5% to about 20%, about 5% to about 30%, about 5% to about 40%, about 5% to about 50%, about 5% to about 60%, about 60% to about 70%, about 50% to about 70%, about 40% to about 70%, about 30% to about 70%, about 20% to about 70%, about 10% to about 70% w/w of the composition. In some embodiments, phosphatidylserine is present in an amount of about 10% to about 60%, about 20% to about 40%, about 20% to about 30%, about 25% to about 35%, or about 30% to about 40% w/w of the composition. In some embodiments, phosphatidylserine is present in an amount of about 20% to about 25%, about 22% to about 27%, about 25% to about 30%, or about 27% to about 32% w/w of the composition. For example, about 20%, about 21%, about 22%, about 23%, about 24%, about 25%, about 26%, about 27%, about 28%, about 29%, about 30%, about 31%, about 32%, about 32%, about 33%, about 34%, or about 35% w/w of the composition.

In some embodiments, a composition as provided herein comprises or consists essentially of: a flavone present in an amount of about 12% to about 20% w/w of the composition; and a phospholipid present in an amount of about 25% to about 35% w/w of the composition.

In some embodiments, a composition as provided herein comprises or consists essentially of: a benzopyran and/or chromanol present in an amount of about 50% to about 60% w/w of the composition; and a phospholipid present in an amount of about 25% to about 35% w/w of the composition.

In some embodiments, a composition as provided herein comprises or consists essentially of: a benzopyran and/or chromanol present in an amount of about 50% to about 60% w/w of the composition; and a flavone present in an amount of about 12% to about 20% w/w of the composition. In some embodiments, a composition as provided herein comprises or consists essentially of: a benzopyran and/or chromanol present in an amount of about 50% to about 60% w/w of the composition; a flavone present in an amount of about 12% to about 20% w/w of the composition; and a phospholipid present in an amount of about 25% to about 35% w/w of the composition.

In some embodiments, a composition as provided herein comprises two or more of vitamin E; epicatechin; and phosphatidylserine. For example, in some embodiments, the composition comprises vitamin E and epicatechin. In some embodiments, the composition comprises epicatechin and phosphatidylserine. In some embodiments, the composition comprises vitamin E and phosphatidylserine. In some embodiments, the composition comprises vitamin E, epicatechin, and phosphatidylserine.

In some embodiments, the composition comprises epicatechin present in an amount of about 12% to about 20% w/w of the composition; and phosphatidylserine present in an amount of about 25% to about 35% w/w of the composition.

In some embodiments, the composition comprises vitamin E present in an amount of about 50% to about 60% w/w of the composition; and epicatechin present in an amount of about 12% to about 20% w/w of the composition.

In some embodiments, the composition comprises vitamin E present in an amount of about 50% to about 60% w/w of the composition; and phosphatidylserine present in an amount of about 25% to about 35% w/w of the composition.

In some embodiments, the composition comprises vitamin E present in an amount of about 50% to about 60% w/w of the composition; epicatechin present in an amount of about 12% to about 20% w/w of the composition; and phosphatidylserine present in an amount of about 25% to about 35% w/w of the composition.

In some embodiments, the composition comprises epicatechin present in an amount of about 16% w/w of the composition; and phosphatidylserine present in an amount of about 28% w/w of the composition.

In some embodiments, the composition comprises vitamin E present in an amount of about 56% w/w of the composition; and epicatechin present in an amount of about 16% w/w of the composition.

In some embodiments, the composition comprises vitamin E present in an amount of about 56% w/w of the composition; and phosphatidylserine present in an amount of about 28% w/w of the composition.

In some embodiments, the composition comprises vitamin E present in an amount of about 56% w/w of the composition; epicatechin present in an amount of about 16% w/w of the composition; and phosphatidylserine present in an amount of about 28% w/w of the composition.

Composition B can be formulated for oral delivery in a variety of ways. For example, the composition can be in the form of a tablet or powder. As another example, Composition B can be in the form of a liquid, solution, suspension, gummy, tablet, powder, soft gelatin capsules, or hard gelatin capsules. Commercial dietary supplements are generally formulated for oral administration. For oral administration, tablets or capsules can be prepared by conventional means with pharmaceutically acceptable excipients such as binding agents, fillers, lubricants, disintegrants, or wetting agents. The tablets can be coated by methods known in the art. Liquid preparations for oral administration can take the form of, for example, solutions, syrups, or suspension, or they can be presented as a dry product for constitution with saline or other suitable liquid vehicle before use. For example, Composition B can be presented as dry powder and dissolved in a suitable liquid carrier. In some embodiments, Composition B can be diluted in a suitable liquid carrier. I some embodiments, Composition B is diluted in an energy drink. In some embodiments, liquid preparations also can contain pharmaceutically acceptable additives such as suspending agents, emulsifying agents, non-aqueous vehicles, preservatives, buffer salts, flavoring agents, coloring agents, and sweetening agents as appropriate. In some embodiments, Composition B can be presented as a stick pack. Preparations for oral administration can be suitably formulated to give controlled release of the compound.

Tablets and powders can be configured to have a unit dosage equal to the daily desired dosage. For example, if a subject desires 1000 mg of a particular composition, each tablet can be 1000 mg in weight. As another example, if a subject desires 1000 mg of a particular composition each tablet can be 500 mg in weight and the subject can take two tablets. The dosages of a particular composition will depend on many factors including the mode of administration. As an example, Composition B can be formulated in a dose such that an individual receives the amounts as shown in Table 2, e.g., in a single tablet, divided among 2 or more tablets, or as a powder.

TABLE 2

| Components | Dosage Amount (mg) |
| --- | --- |
| vitamin E | 200 |
| epicatechin | 55 |
| phosphatidylserine | 103 |

In addition, a composition provided herein can contain a pharmaceutically acceptable carrier for in vivo administration to a subject. Such pharmaceutically acceptable carriers include, without limitation, sterile aqueous or non-aqueous solutions, suspensions, and emulsions. Examples of non-aqueous solvents include, without limitation, propylene glycol, polyethylene glycol, vegetable oils, and injectable organic esters. Aqueous carriers include water, alcohol, saline, and buffered solutions. Pharmaceutically acceptable carriers also can include physiologically acceptable aqueous vehicles (e.g., physiological saline) or other known carriers appropriate to specific routes of administration. Preservatives, flavorings, and other additives such as, for example, proteins, anti-microbials, chelating agents, inert gases, and the like also can be present in a composition.

Composition C

Also provided here are compositions comprising: one or more agents that increase brain-derived neurotrophic factor (BDNF); and one or more NMDA and/or AMPA receptor modulators. In some embodiments, the one or more agents that increase brain-derived neurotrophic factor (BDNF) synthesis modulate CREB. In some embodiments, the one or more agents that increase brain-derived neurotrophic factor (BDNF) are selected from the group consisting of: a benzopyran and/or a chromanol; and a flavone. In some embodiments, the one or more NMDA and/or AMPA receptor modulators comprises a phospholipid.

Also provided herein are composition comprising two or more of: a benzopyran and/or chromanol; a flavone; and a phospholipid. In some embodiments, the composition comprises a benzopyran and/or chromanol; and a phospholipid. In some embodiments, the composition comprises a flavone; and a phospholipid. In some embodiments, the composition comprises a benzopyran and/or chromanol; and a flavone. In some embodiments, the composition comprises a benzopyran and/or chromanol; a flavone; and a phospholipid.

In some embodiments, the flavone is present in an amount of about 10% to about 85% w/w of the composition. For example, about 10% to about 20%, about 10% to about 30%, about 10% to about 40%, about 10% to about 50%, about 10% to about 60%, about 10% to about 70%, about 10% to about 80%, about 70% to about 85%, about 60% to about 85%, about 50% to about 85%, about 40% to about 85%, about 30% to about 85%, about 20% to about 85%, or about 10% to about 85% w/w of the composition. In some embodiments, the flavone is present in amount of about 20% to about 80%, about 30% to about 60%, about 20% to about 60%, or about 30% to about 50% w/w of the composition. In some embodiments, the flavone is a flavone that enhances acetylcholine signaling.

In some embodiments, the flavone is present in an amount of about 5% to about 60% w/w of the composition. For example, about 5% to about 10%, about 5% to about 20%, about 5% to about 30%, about 5% to about 40%, about 5% to about 50%, about 50% to about 60%, about 40% to about 60%, about 30% to about 60%, about 20% to about 60%, or about 10% to about 60% w/w of the composition. In some embodiments, the flavone is present in amount of about 35% to about 45%, about 40% to about 50%, about 45% to about 55%, about 50% to about 60%, about 55% to about 65%, about 45% to about 50%, about 42% to about 47%, or about 47% to about 52%, w/w of the composition. For example, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, or about 60% w/w of the composition. In some embodiments, the flavone is a flavone that enhances acetylcholine signaling.

In some embodiments, the flavone is present in an amount of about 10% to about 20%, about 8% to about 12%, about 10% to about 15%, about 12% to about 17%, about 15% to about 20%, or about 17% to about 22% w/w of the composition. For example, about 8%, about 9%, about 10%, about 11%, about 12%, about 13%, about 14%, about 15%, about 16%, about 17%, about 18%, about 19%, about 20%, about 21%, about 22%, or about 23% w/w of the composition. In some embodiments, the flavone is present in an amount of about 20% to about 25%, about 22% to about 27%, about 25% to about 30%, or about 27% to about 32% w/w of the composition. For example, about 20%, about 21%, about 22%, about 23%, about 24%, about 25%, about 26%, about 27%, about 28%, about 29%, about 30%, about 31%, about 32%, about 32%, about 33%, about 34%, or about 35% w/w of the composition.

In some embodiments, the flavone comprises a hydroxyflavone. In some embodiments, the hydroxyflavone is a combination of quercetin and luteolin. In some embodiments, the combination of quercetin and luteolin is present in an amount of about 10% to about 85% w/w of the composition. For example, about 10% to about 20%, about 10% to about 30%, about 10% to about 40%, about 10% to about 50%, about 10% to about 60%, about 10% to about 70%, about 10% to about 80%, about 70% to about 85%, about 60% to about 85%, about 50% to about 85%, about 40% to about 85%, about 30% to about 85%, about 20% to about 85%, or about 10% to about 85% w/w of the composition. In some embodiments, the combination of quercetin and luteolin is present in amount of about 20% to about 80%, about 30% to about 60%, about 20% to about 60%, or about 30% to about 50% w/w of the composition.

In some embodiments, the combination of quercetin and luteolin is present in an amount of about 5% to about 60% w/w of the composition. For example, about 5% to about 10%, about 5% to about 20%, about 5% to about 30%, about 5% to about 40%, about 5% to about 50%, about 50% to about 60%, about 40% to about 60%, about 30% to about 60%, about 20% to about 60%, or about 10% to about 60% w/w of the composition. In some embodiments, the combination of quercetin and luteolin is present in amount of about 35% to about 45%, about 40% to about 50%, about 45% to about 55%, about 50% to about 60%, about 55% to about 65%, about 45% to about 50%, about 42% to about 47%, or about 47% to about 52%, w/w of the composition. For example, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, or about 60% w/w of the composition.

In some embodiments, the quercetin is present in an amount of about 5% to about 20% w/w of the composition. In some embodiments, the quercetin is present in an amount of about 8% to about 12%, about 10% to about 15%, about 12% to about 17%, about 13% to about 15% w/w, about 15% to about 20%, or about 17% to about 22% w/w of the composition. For example, about 8%, about 9%, about 10%, about 11%, about 12%, about 13%, about 14%, about 15%, about 16%, about 17%, about 18%, about 19%, about 20%, about 21%, about 22%, or about 23% w/w of the composition.

In some embodiments, the luteolin is present in an amount of about 15% to about 50% w/w of the composition. For example, about 10% to about 15%, about 10% to about 20%, about 10% to about 25%, about 10% to about 30%, about 10% to about 35%, about 10% to about 40%, about 10% to about 45%, about 45% to about 50%, about 40% to about 50%, about 35% to about 50%, about 30% to about 50%, about 25% to about 50%, or about 20% to about 50% w/w of the composition. In some embodiments, the luteolin is present in an amount of about 20% to about 25%, about 22% to about 27%, about 25% to about 30%, or about 27% to about 32% w/w of the composition. For example, about 20%, about 21%, about 22%, about 23%, about 24%, about 25%, about 26%, about 27%, about 28%, about 29%, about 30%, about 31%, about 32%, about 32%, about 33%, about 34%, %, about 35%, about 36%, about 37%, about 38%, about 39%, or about 40% w/w of the composition.

In some embodiments, the carboxylic acid or carboxylic acid derivative is present in an amount of about 10% to about 90% w/w of the composition. For example, about 10% to about 20%, about 10% to about 30%, about 10% to about 40%, about 10% to about 50%, about 10% to about 60%, about 10% to about 70%, about 10% to about 80%, about 80% to about 90%, about 70% to about 90%, about 60% to about 90%, about 50% to about 90%, about 40% to about 90%, about 30% to about 90%, or about 20% to about 90% w/w of the composition. In some embodiments, the carboxylic acid or carboxylic acid derivative is present in an amount of about 20% to about 70%, bout 40% to about 60%, about 40% to about 50%, about 45% to about 55%, about 50% to about 60%, about 55% to about 60%, about 53% to about 58%, about 55% to about 57%, about 55% to about 65%, about 60% to about 70%, or about 65% to about 75% w/w of the composition. For example, about 45%, about 46%, about 47%, about 48%, about 49%, about 50%, about 51%, about 52%, about 53%, about 54%, about 55%, about 56%, about 57%, about 58%, about 59%, or about 60% w/w of the composition. In some embodiments, the carboxylic acid or carboxylic acid derivative is present in an amount of about 10% to about 60%, about 20% to about 40%, about 20% to about 30%, about 25% to about 35%, or about 30% to about 40% w/w of the composition. In some embodiments, the carboxylic acid or carboxylic acid derivative is present in an amount of about 20% to about 25%, about 22% to about 27%, about 25% to about 30%, or about 27% to about 32% w/w of the composition. For example, about 20%, about 21%, about 22%, about 23%, about 24%, about 25%, about 26%, about 27%, about 28%, about 29%, about 30%, about 31%, about 32%, about 32%, about 33%, about 34%, or about 35% w/w of the composition.

In some embodiments, the composition comprises two carboxylic acid or carboxylic acid derivatives.

In some embodiments, the first carboxylic acid or carboxylic acid derivative is present in an amount of about 10% to about 80% w/w of the composition. For example, about 10% to about 20%, about 10% to about 30%, about 10% to about 40%, about 10% to about 50%, about 10% to about 60%, about 10% to about 70%, about 70% to about 80%, about 60% to about 80%, about 50% to about 80%, about 40% to about 80%, about 30% to about 80%, or about 20% to about 80% w/w of the composition. In some embodiments, the first carboxylic acid or carboxylic acid derivative is present in an amount of about 20% to about 70%, about 40% to about 60%, about 40% to about 50%, about 45% to about 55%, about 50% to about 60%, about 55% to about 60%, about 53% to about 58%, about 55% to about 57%, about 55% to about 65%, about 60% to about 70%, or about 65% to about 75% w/w of the composition. In some embodiments, the first carboxylic acid or carboxylic acid derivative is present in an amount of about 35% to about 65% w/w of the composition. For example, about 35% to about 45%, about 40% to about 50%, about 45% to about 55%, about 50% to about 60%, or about 55% to about 65% w/w of the composition. In some embodiments, the first carboxylic acid or carboxylic acid derivative is present in an amount of about 40% to about 45%, about 42% to about 47%, about 45% to about 50%, about 47% to about 52%, about 50% to about 55%, about 52% to about 57%, or about 55% to about 60% w/w of the composition. For example, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, or about 65% w/w of the composition. In some embodiments, caffeic acid is the first carboxylic acid or carboxylic acid derivative.

In some embodiments, the first carboxylic acid or carboxylic acid derivative is present in an amount of about 5% to about 30% w/w of the composition. For example, about 5% to about 10%, about 5% to about 15%, about 5% to about 20%, about 5% to about 25%, about 25% to about 30%, about 20% to about 30%, about 15% to about 30%, or about 10% to about 30% w/w of the composition. In some embodiments, the first carboxylic acid or carboxylic acid derivative is present in an amount of about 5% to about 20%, about 10% to about 25%, about 10% to about 20%, about 12% to about 20%, about 14% to about 18%, or about 15% to about 17% w/w of the composition. For example, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, or about 25% w/w of the composition.

In some embodiments, the second carboxylic acid or carboxylic acid derivative is present in an amount of about 1% to about 10% w/w of the composition. For example, about 1% to about 2%, about 1% to about 4%, about 1% to about 6%, about 1% to about 8%, about 9% to about 10%, about 8% to about 10%, about 7% to about 10%, about 6% to about 10%, about 5% to about 10%, about 4% to about 10%, about 3% to about 10%, about 2% to about 10% w/w of the composition. In some embodiments, the second carboxylic acid or carboxylic acid derivative is present in an amount of about 1% to about 3%, about 2% to about 4%, about 3% to about 5%, about 4% to about 6%, about 5% to about 7%, about 6% to about 8%, about 7% to about 9%, or about 8% to about 10% w/w of the composition. In some embodiments, the second carboxylic acid or carboxylic acid derivative is present in an amount of about 1%, about 2%, about 3%, about 4%, about 5%, about 6%, about 7%, about 8%, about 9%, or about 10% w/w of the composition. In some embodiments, rosmarinic acid is the second carboxylic acid or carboxylic acid derivative.

In some embodiments, the composition further comprises a third carboxylic acid or carboxylic acid derivative.

In some embodiments, the composition comprises a combination of caffeic acid, hydrocinnamic acid, and rosmarinic acid.

In some embodiments, the terpene or terpenoid is present in an amount of about 5% to about 75% w/w of the composition. For example, about 5% to about 10%, about 5% to about 15%, about 5% to about 20%, about 5% to about 25%, about 5% to about 30%, about 5% to about 35%, about 5% to about 40%, about 5% to about 45%, about 5% to about 50%, about 5% to about 60%, about 5% to about 70%, about 70% to about 75%, about 60% to about 75%, about 50% to about 75%, about 45% to about 75%, about 40% to about 75%, about 35% to about 75%, about 30% to about 75%, about 25% to about 75%, about 20% to about 75%, or about 10% to about 75% w/w of the composition. In some embodiments, the terpene or terpenoid is present in an amount of about 1 to about 40%, about 10% to about 50%, about 1% to about 50%, about 1.5% to about 20%, about 20% to about 30%, about 20% to about 25%, about 22% to about 27%, about 25% to about 30%, or about 27% to about 32% w/w of the composition. For example, about 20%, about 21%, about 22%, about 23%, about 24%, about 25%, about 26%, about 27%, about 28%, about 29%, about 30%, about 31%, about 32%, about 32%, about 33%, about 34%, about 35%, about 36%, about 37%, about 38%, about 39%, about 40%, about 41%, about 42%, about 43%, about 44%, or about 45% w/w of the composition.

In some embodiments, the composition comprises two terpenes or terpenoids.

In some embodiments, the first terpene or terpenoid is present in an amount about 0.5% to about 55% w/w of the composition. For example, about 0.5% to about 10%, about 0.5% to about 20%, about 0.5% to about 30%, about 0.5% to about 40%, about 40% to about 50%, about 30% to about 50%, about 20% to about 50%, about 10% to about 50%, about 20% to about 30%, about 25% to about 35%, or about 30% to about 40% w/w of the composition. In some embodiments, the first terpene or terpenoid is present in an amount of about 20% to about 25%, about 22% to about 27%, 25% to about 30%, or about 27% to about 32% w/w of the composition. For example, about 20%, about 21%, about 22%, about 23%, about 24%, about 25%, about 26%, about 27%, about 28%, about 29%, about 30%, about 31%, about 32%, about 32%, about 33%, about 34%, or about 35% w/w of the composition. In some embodiments, the first terpene or terpenoid is asiatic acid.

In some embodiments, the second terpene or terpenoid is present in an amount of about is present in an amount of about 1% to about 10% w/w of the composition. For example, about 1% to about 2%, about 1% to about 4%, about 1% to about 6%, about 1% to about 8%, about 9% to about 10%, about 8% to about 10%, about 7% to about 10%, about 6% to about 10%, about 5% to about 10%, about 4% to about 10%, about 3% to about 10%, about 2% to about 10% w/w of the composition. In some embodiments, the second terpene or terpenoid is present in an amount of about 1% to about 3%, about 2% to about 4%, about 3% to about 5%, about 4% to about 6%, about 5% to about 7%, about 6% to about 8%, about 7% to about 9%, or about 8% to about 10% w/w of the composition. In some embodiments, the second terpene or terpenoid is present in an amount of about 1%, about 2%, about 3%, about 4%, about 5%, about 6%, about 7%, about 8%, about 9%, or about 10% w/w of the composition. In some embodiments, the second terpene or terpenoid is ursolic acid.

In some embodiments, the third terpene or terpenoid is present in an amount of about is present in an amount of about 1% to about 10% w/w of the composition. For example, about 1% to about 2%, about 1% to about 4%, about 1% to about 6%, about 1% to about 8%, about 9% to about 10%, about 8% to about 10%, about 7% to about 10%, about 6% to about 10%, about 5% to about 10%, about 4% to about 10%, about 3% to about 10%, about 2% to about 10% w/w of the composition. In some embodiments, the third terpene or terpenoid is present in an amount of about 1% to about 3%, about 2% to about 4%, about 3% to about 5%, about 4% to about 6%, about 5% to about 7%, about 6% to about 8%, about 7% to about 9%, or about 8% to about 10% w/w of the composition. In some embodiments, the third terpene or terpenoid is present in an amount of about 1%, about 2%, about 3%, about 4%, about 5%, about 6%, about 7%, about 8%, about 9%, or about 10% w/w of the composition. In some embodiments, the third terpene or terpenoid is huperzine A.

In some embodiments, the composition comprises a combination of asiatic acid, ursolic acid, and huperzine A.

In some embodiments, the composition comprises two or more of huperzine A; asiatic acid; luteolin; quercetin; rosmarinic acid; ursolic acid; and caffeic acid. For example, in some embodiments, the composition comprises any three of huperzine A; asiatic acid; luteolin; quercetin; rosmarinic acid; ursolic acid; and caffeic acid. In some embodiments, the composition comprises any four of huperzine A; asiatic acid; luteolin; quercetin; rosmarinic acid; ursolic acid; and caffeic acid. In some embodiments, the composition comprises any five of huperzine A; asiatic acid; luteolin; quercetin; rosmarinic acid; ursolic acid; and caffeic acid. In some embodiments, the composition comprises any six of huperzine A; asiatic acid; luteolin; quercetin; rosmarinic acid; ursolic acid; and caffeic acid. In some embodiments, huperzine A present in an amount of about 0.05% to about 5% w/w of the composition. In some embodiments, asiatic acid present in an amount of about 22% to about 32% w/w of the composition. In some embodiments, luteolin present in an amount of about 10% to about 50% w/w of the composition. In some embodiments, quercetin present in an amount of about 5% to about 15% w/w of the composition. In some embodiments, rosmarinic acid present in an amount of about 1% to about 10% w/w of the composition. In some embodiments, ursolic acid present in an amount of about 1% to about 10% w/w of the composition. In some embodiments, caffeic acid present in an amount of about 40% to about 60% w/w of the composition.

In some embodiments, the composition comprises or consists essentially of: huperzine A present in an amount of about 0.05% to about 5% w/w of the composition; asiatic acid present in an amount of about 22% to about 32% w/w of the composition; luteolin present in an amount of about 10% to about 50% w/w of the composition; quercetin present in an amount of about 5% to about 15% w/w of the composition; rosmarinic acid present in an amount of about 1% to about 10% w/w of the composition; ursolic acid present in an amount of about 1% to about 10% w/w of the composition; and caffeic acid present in an amount of about 40% to about 60% w/w of the composition.

In some embodiments, the composition comprises or consists essentially of: huperzine A present in an amount of about 2% w/w of the composition; asiatic acid present in an amount of about 27% w/w of the composition; luteolin present in an amount of about 34% w/w of the composition; quercetin present in an amount of about 14% w/w of the composition; rosmarinic acid present in an amount of about 4% w/w of the composition; ursolic acid present in an amount of about 6% w/w of the composition; and caffeic acid present in an amount of about 50% w/w of the composition.

Composition C can be formulated for oral delivery in a variety of ways. For example, the composition can be in the form of a tablet or powder. As another example, Composition C can be in the form of a liquid, solution, suspension, gummy, tablet, powder, soft gelatin capsules, or hard gelatin capsules. Commercial dietary supplements are generally formulated for oral administration. For oral administration, tablets or capsules can be prepared by conventional means with pharmaceutically acceptable excipients such as binding agents, fillers, lubricants, disintegrants, or wetting agents. The tablets can be coated by methods known in the art. Liquid preparations for oral administration can take the form of, for example, solutions, syrups, or suspension, or they can be presented as a dry product for constitution with saline or other suitable liquid vehicle before use. For example, Composition C can be presented as dry powder and dissolved in a suitable liquid carrier. In some embodiments, Composition C can be diluted in a suitable liquid carrier. I some embodiments, Composition C is diluted in an energy drink. In some embodiments, liquid preparations also can contain pharmaceutically acceptable additives such as suspending agents, emulsifying agents, non-aqueous vehicles, preservatives, buffer salts, flavoring agents, coloring agents, and sweetening agents as appropriate. In some embodiments, Composition C can be presented as a stick pack. Preparations for oral administration can be suitably formulated to give controlled release of the compound.

Tablets and powders can be configured to have a unit dosage equal to the daily desired dosage. For example, if a subject desires 1000 mg of a particular composition, each tablet can be 1000 mg in weight. As another example, if a subject desires 1000 mg of a particular composition each tablet can be 500 mg in weight and the subject can take two tablets. The dosages of a particular composition will depend on many factors including the mode of administration. As an example, Composition C can be formulated in a dose such that an individual receives the amounts as shown in Table 3, e.g., in a single tablet, divided among 2 or more tablets, or as a powder.

TABLE 3

| Components | Dosage Amount (mg) |
|---|---|
| huperzine A | 6 |
| asiatic acid | 100 |
| luteolin | 125 |
| quercetin | 50 |
| rosmarinic acid | 15 |
| ursolic acid | 24 |
| caffeic acid | 50 |

In addition, a composition provided herein can contain a pharmaceutically acceptable carrier for in vivo administration to a subject. Such pharmaceutically acceptable carriers include, without limitation, sterile aqueous or non-aqueous solutions, suspensions, and emulsions. Examples of non-aqueous solvents include, without limitation, propylene glycol, polyethylene glycol, vegetable oils, and injectable organic esters. Aqueous carriers include water, alcohol, saline, and buffered solutions. Pharmaceutically acceptable carriers also can include physiologically acceptable aqueous vehicles (e.g., physiological saline) or other known carriers appropriate to specific routes of administration. Preservatives, flavorings, and other additives such as, for example, proteins, anti-microbials, chelating agents, inert gases, and the like also can be present in a composition.

Methods

Also provided herein are methods for improving and/or stabilizing memory and/or focus of a subject comprising administering to the subject any of the compositions as described herein. In some embodiments, a composition as described herein can improve the short-term memory, long-term memory, and/or focus of a subject. For example, the short-term memory, long-term memory, and/or focus of the subject can improve after administration of a composition as described herein as compared to before administration of the composition. In some embodiments, a composition as described herein can stabilize the short-term memory, long-term memory, and/or focus of a subject. For example, the short-term memory, long-term memory, and/or focus of the subject can stabilize after administration of a composition as described herein as compared to before administration of the composition. In some embodiments, the short-term memory, long-term memory, and/or focus of the subject was decreasing prior to administration of a composition as described herein. Methods of testing memory and/or focus are well known to one of ordinary skill in the art. Non-limiting examples of methods to test memory and/or focus include: MATRICS Consensus Cognitive Battery (see, e.g., Zheng et al. *J Affect Disord.* 2019 Mar. 1; 246:241-247, which is incorporated by reference herein); Rey Auditory Verbal Learning Test (see, e.g., Labban et al. *J Sport Exerc Psychol.* 2018 Dec. 1; 40(6):336-342, which is incorporated by reference herein); and the Continuous Performance Test-Identical Pairs (CPT-IP) (see, e.g., Zheng et al. *J Affect Disord.* 2019 Mar. 1; 246:241-247, which is incorporated by reference herein).

Also provided herein are methods for improving the short-term memory of a subject comprising administering to the subject any of the compositions as described in Composition A herein.

In some embodiments, the composition is administered orally.

In some embodiments, an improvement in short-term memory is measured using the MATRICS Consensus Cognitive Battery. In some embodiments, the short-term memory of the subject improves after administration of composition A as compared to before administration of composition A, e.g., as measured using the MATRICS Consensus Cognitive Battery.

Also provided herein are methods for improving the long-term memory of a subject comprising administering to the subject any of the compositions as described in Composition B herein.

In some embodiments, the composition is administered orally.

In some embodiments, an improvement in long-term memory is measured using the Rey Auditory Verbal Learning Test. In some embodiments, the long-term memory of the subject improves after administration of composition B as compared to before administration of composition B, e.g., as measured using the Rey Auditory Verbal Learning Test.

Also provided herein are methods for maintaining memory of a subject comprising administering to the subject any of the compositions as described in Composition C herein. In some embodiments, the method further comprises improving the focus of the subject. In some embodiments, the composition is administered orally.

In some embodiments, an improvement in focus is measured using the Continuous Performance Test-Identical Pairs (CPT-IP). In some embodiments, the focus of the subject improves after administration of composition C as compared to before administration of composition C, e.g., as measured using the Continuous Performance Test-Identical Pairs (CPT-IP).

Also provided herein are methods for improving the focus of a subject comprising administering to the subject any of the compositions as described in Composition C herein. In some embodiments, the method further comprises improving the long-term memory of the subject. In some embodiments, the composition is administered orally.

In some embodiments, an improvement in focus is measured using the Continuous Performance Test-Identical Pairs (CPT-IP). In some embodiments, the focus of the subject improves after administration of composition C as compared to before administration of composition C, e.g., as measured using the Continuous Performance Test-Identical Pairs (CPT-IP).

EXAMPLES

Example 1. In Silico Simulations of Short Term Memory Compositions

Protocol

The in silico simulations were performed using CytoSolve®, a commercially available tool that enables the computational modeling of biomolecular pathways. CytoSolve® can scale and model highly complex biomolecular phenomena by its ability to integrate and couple the computations of smaller biomolecular pathways (see, e.g., Ayyadurai and Forbes-Dewey Jr. Cellular and Molecular Bioengineering. 2011, 4(1):28-45; Nordsletten. IEEE Trans Biomed Eng. 2011; 58(12):3508-12; Ayyadurai and Deonikar. Agricultural Sciences. 2015; 6:630-662; Ayyadurai. Commun Med Care Compunetics. 2011; 1:115-168; Koo et al. Biophys J. 2013; 104(10):2295-306; Sweeney et al. Nat Neurosci. 2016; 19(6):771-83; and Ayyadurai. (2007) Scalable Computational Architecture for Integrating Biological Pathway Models (Doctoral Dissertation, Massachusetts Institute of Technology); each of which is hereby incorporated by reference in its entirety).

Results

FIG. 1 was derived using CytoSolve® to model mechanisms of glutamine-glutamate cycle pathway. Once these pathways were integrated using CytoSolve®, the resulting biomolecular computational model was used to identify the ranges of concentrations of D-glutamine that elicit a synergistic effect on the biomarker, glutamate (see Table 4). The amount of D-glutamine from Table 4 was used to model the effect on glutamate alone versus the control.

Figure 2:
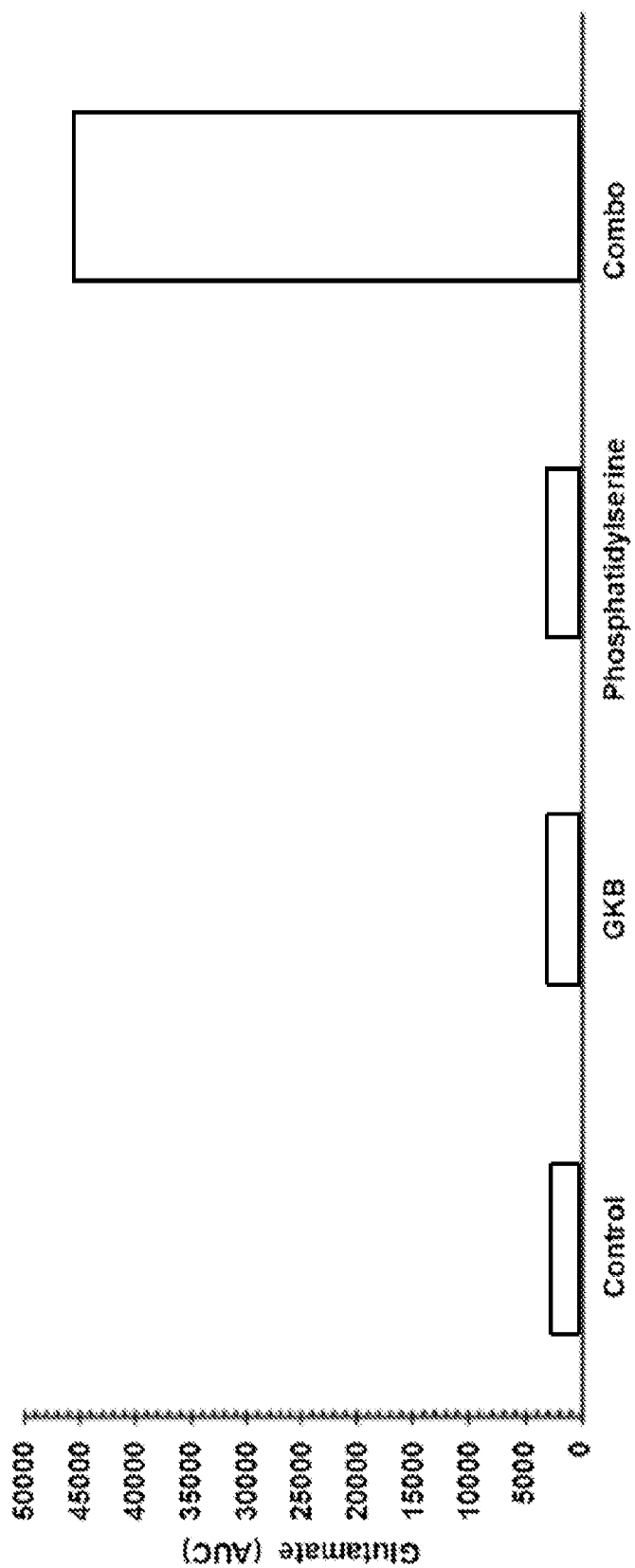
FIG. 2 is a bar graph comparing the AUC of glutamate levels for gingkolide B; phosphatidylserine; and a combination of gingkolide B and phosphatidylserine versus a control. The plot is based on a biomolecular computational model using CytoSolve® and modeling mechanisms of the glutamate neurotransmitter release pathway.

FIG. 2 was derived by using CytoSolve® to model mechanisms of glutamate neurotransmitter release pathway. Once these pathways were integrated using CytoSolve®, the resulting biomolecular computational model was used to identify the ranges of concentrations of ginkgolide B and phosphatidylserine that elicit a synergistic effect on the biomarker, glutamate. The amounts of ginkgolide B and phosphatidylserine from Table 4 were used to model the effect on glutamate versus the control.

Figure 3:
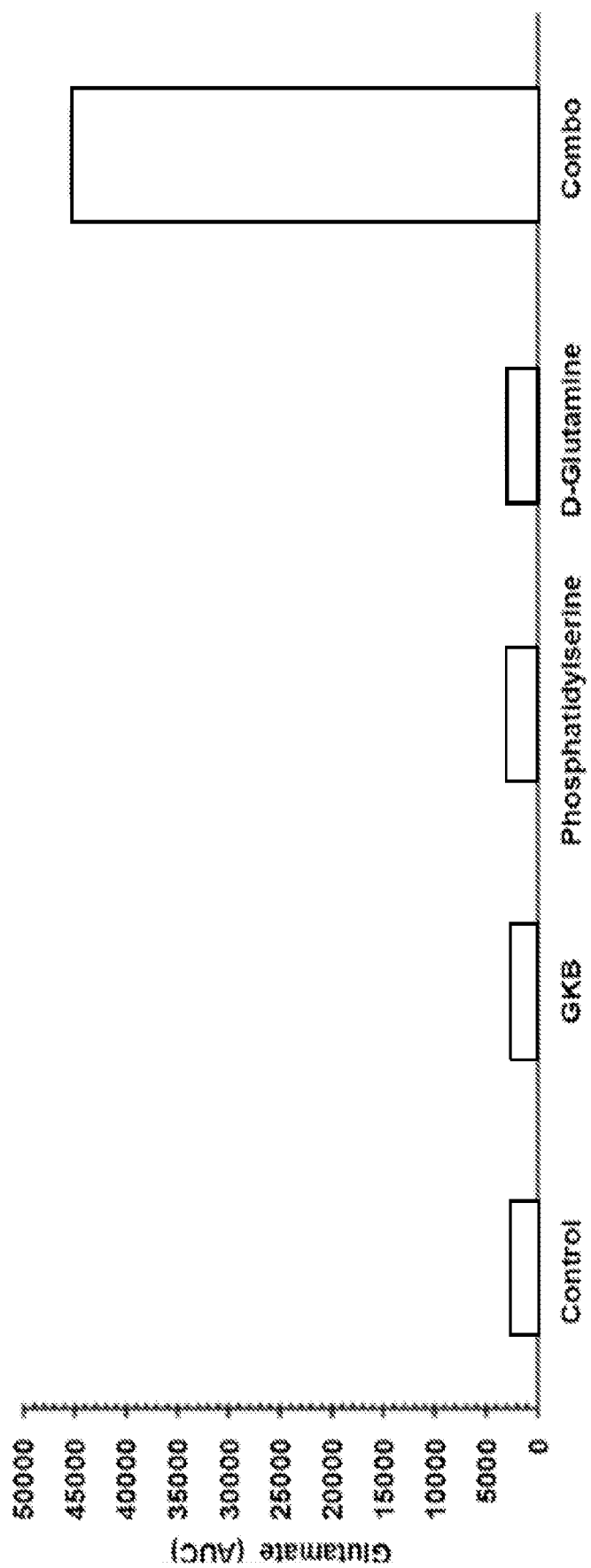
FIG. 3 is a bar graph comparing the AUC of glutamate levels for gingkolide B; phosphatidylserine; D-glutamine; and a combination of gingkolide B, phosphatidylserine, and D-glutamine versus a control. The plot is based on a biomolecular computational model using CytoSolve® and modeling mechanisms of the glutamine-glutamate cycle pathway and glutamate neurotransmitter release pathway.

FIG. 3 was derived by using CytoSolve® to model mechanisms of glutamine-glutamate cycle pathway and glutamate neurotransmitter release pathway. Once these pathways were integrated using CytoSolve®, the resulting biomolecular computational model was used to identify the ranges of concentrations of D-glutamine, ginkgolide B and phosphatidylserine that elicit a synergistic effect on the biomarker, glutamate. The amounts of D-glutamine, ginkgolide B and phosphatidylserine from Table 4 were used to model the effect on glutamate versus the control.

Figure 4:
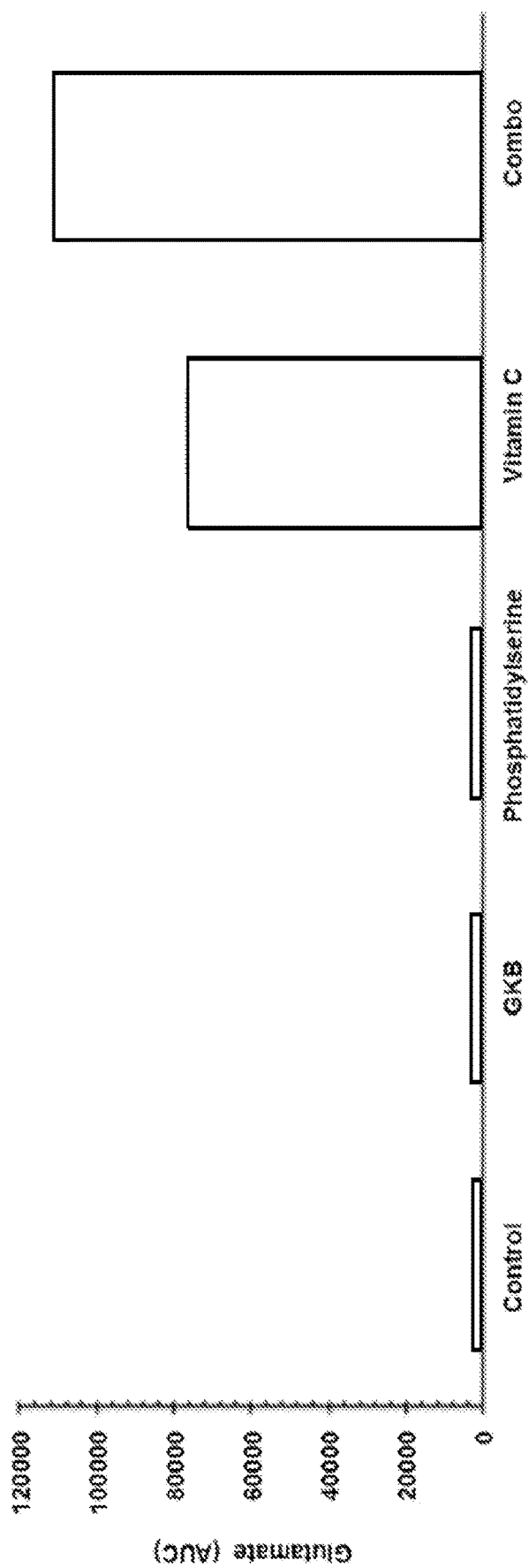
FIG. 4 is a bar graph comparing the AUC of glutamate levels for gingkolide B; phosphatidylserine; vitamin C; and a combination of gingkolide B, phosphatidylserine, and vitamin C versus a control. The plot is based on a biomolecular computational model using CytoSolve® and modeling mechanisms of the glutamate neurotransmitter release pathway.

FIG. 4 was derived using CytoSolve® to model mechanisms of glutamate neurotransmitter release pathway. Once these pathways were integrated using CytoSolve®, the resulting biomolecular computational model was used to identify the ranges of concentrations of Vitamin C, ginkgolide B and phosphatidylserine that elicit a synergistic effect on the biomarker, glutamate. The amounts of Vitamin C, ginkgolide B and phosphatidylserine from Table 4 were used to model the effect on glutamate versus the control.

Figure 5:
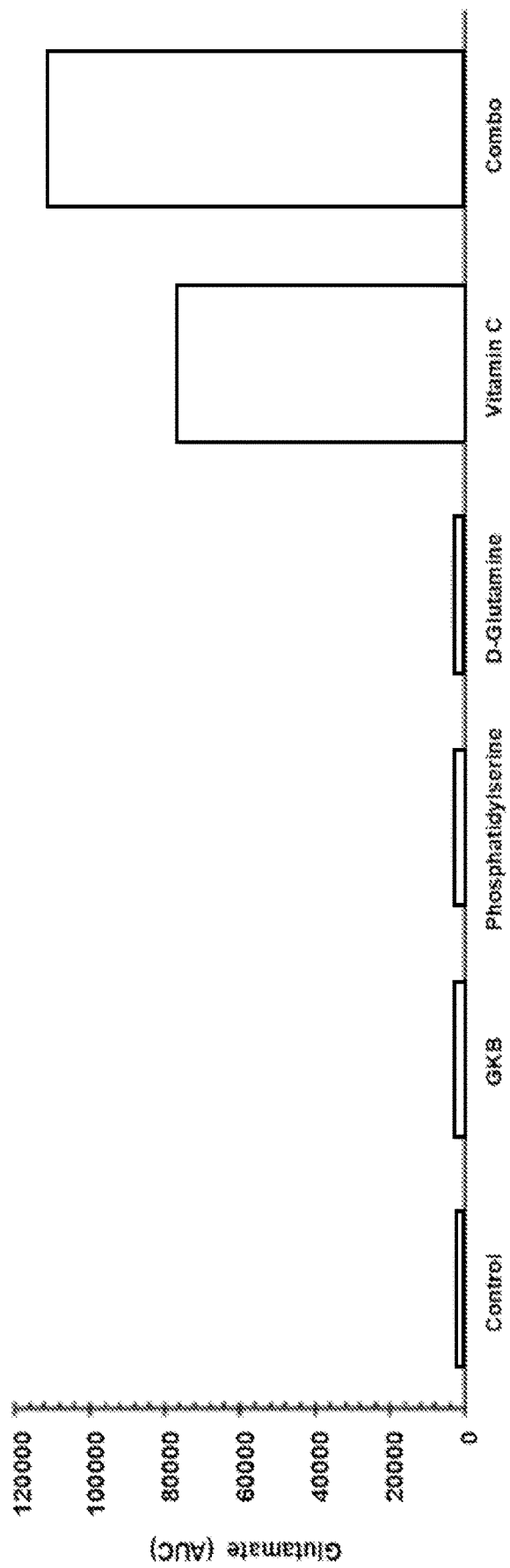
FIG. 5 is a bar graph comparing the AUC of glutamate levels for gingkolide B; phosphatidylserine; D-glutamine; vitamin C; and a combination of gingkolide B, phosphatidylserine, D-glutamine, and vitamin C versus a control. The plot is based on a biomolecular computational model using CytoSolve® and modeling mechanisms of the glutamine-glutamate cycle pathway and glutamate neurotransmitter release pathway.

FIG. 5 was derived by using CytoSolve® to model mechanisms of glutamine-glutamate cycle pathway and glutamate neurotransmitter release pathway. Once these pathways were integrated using CytoSolve®, the resulting biomolecular computational model was used to identify the ranges of concentrations of D-Glulatmine, Vitamin C Ginkgolide B and phosphatidylserine that elicit a synergistic effect on the biomarker, glutamate, see Table 4.

TABLE 4

| Components | Dosage Amount (mg) |
| --- | --- |
| D-glutamine | 83.6 |
| ginkgolide B | 0.84 |
| phosphatidylserine | 250 |
| vitamin C | 5 |

Example 2. In Vitro Efficacy Testing of Short Term Memory Compositions

Protocol

The in vitro efficacy for the short term memory composition (Composition A) is conducted using primary cell culture of hippocampal neurons as described in Edwards et al., 2011 (see, e.g., Edwards et al. *J Neurosci Methods.* 2011; 190; 2:155-163, which is incorporated by reference herein in its entirety). Experiments are conducted with and without the application of Composition A. Glutamate is measured in the cell culture as an indicator of short term memory. Samples from cell culture are withdrawn and tested for glutamate using high-performance liquid chromatography (HPLC) (see, e.g., Chefer et al. *Curr Protoc Neurosci.* 2009; Chapter 7: Unit 7.1, which is incorporated by reference herein in its entirety). Additionally, an electrochemical biosensor is used to measure glutamate levels in the sample from cell culture based on glutamate oxidase (GluOx) to generate $H_2O_2$, which is electrochemically detectable (see, e.g., Özel et al. *Biosens Bioelectron.* 2014; 15; 52:397-402, which is incorporated by reference herein in its entirety).

Expected Results

Comparison of glutamate levels in the cell culture with and without application of Composition A is performed to determine the efficacy of Composition A.

Example 3. Clinical Efficacy Testing of Short Term Memory Compositions

Protocol

A clinical efficacy study is conducted for Composition A using 100 subjects over a period of four (4) weeks. The clinical study protocol is described below.

Study Group Selection
1. Inclusion Criteria
   a. Age group: Adult population in the age group of ≥18 years
   b. Gender: Male and female (females should be on birth control)
   c. Education: Should be undertaking full-time post-secondary training at a four-year or two-year college or have completed such training
   d. Inclusion criteria test: MATRICS Consensus Cognitive Battery (see, e.g., Zheng et al. *J Affect Disord.* 2019 Mar. 1; 246:241-247, which is incorporated by reference herein)
2. Exclusion criteria:
   a. Individuals with high scores (e.g. >6 on the scale of 1-10) Pregnant or nursing individuals
   b. Individuals with chronic illness
   c. Individuals receiving ADHD medication
   d. Individuals taking other memory/focus supplements
   e. Regular consumers of caffeine, nicotine and energy drinks Study Type Selection
   Placebo-controlled Randomized clinical study: Random allocation to either the group receiving the supplement under investigation or to a group receiving placebo treatment as the control.

Study Design Type
   Parallel-group: Each participant is randomly assigned to a group, and all the participants in the group receive (or do not receive) Composition A.

Outcome Measurements
1. Based on MATRICS Consensus Cognitive Battery
2. Primary outcome and secondary outcomes are included
3. The outcome measurement is a self-monitored questionnaire (or a smartphone app) or reported by people who know the participant in the study Results Results obtained from the clinical study are analyzed to determine efficacy of Composition A using the following steps:
1. Appropriate statistical tests are performed to estimate the change levels in the 95% confidence interval for the two study groups where the outcome measure is in the form of an ordinal level scale. Examples of such tests include:
   a. Wilcoxson Rank-Sum test
   b. Mann-Whiney U test
2. An intention-to-treat (ITT) analysis is performed to overcome the issue arising from dropouts i.e. "Attrition bias."

Example 4. In Silico Simulations of Long Term Memory and/or Focus Compositions Protocol The in silico simulations were performed using Cyto-Solve®, a commercially available tool that enables the computational modeling of biomolecular pathways. Cyto-Solve® can scale and model highly complex biomolecular phenomena by its ability to integrate and couple the computations of smaller biomolecular pathways (see, e.g., Ayyadurai and Forbes-Dewey Jr. *Cellular and Molecular Bioengineering.* 2011, 4(1):28-45; Nordsletten. *IEEE Trans Biomed Eng.* 2011; 58(12):3508-12; Ayyadurai and Deonikar. *Agricultural Sciences.* 2015; 6:630-662; Ayyadurai. *Commun Med Care Compunetics.* 2011; 1:115-168; Koo et al. *Biophys J.* 2013; 104(10):2295-306; Sweeney et al. *Nat Neurosci.* 2016; 19(6):771-83; and Ayyadurai. (2007) Scalable Computational Architecture for Integrating Biological Pathway Models (Doctoral Dissertation, Massachusetts Institute of Technology); each of which is hereby incorporated by reference in its entirety).

Results

Figure 6:
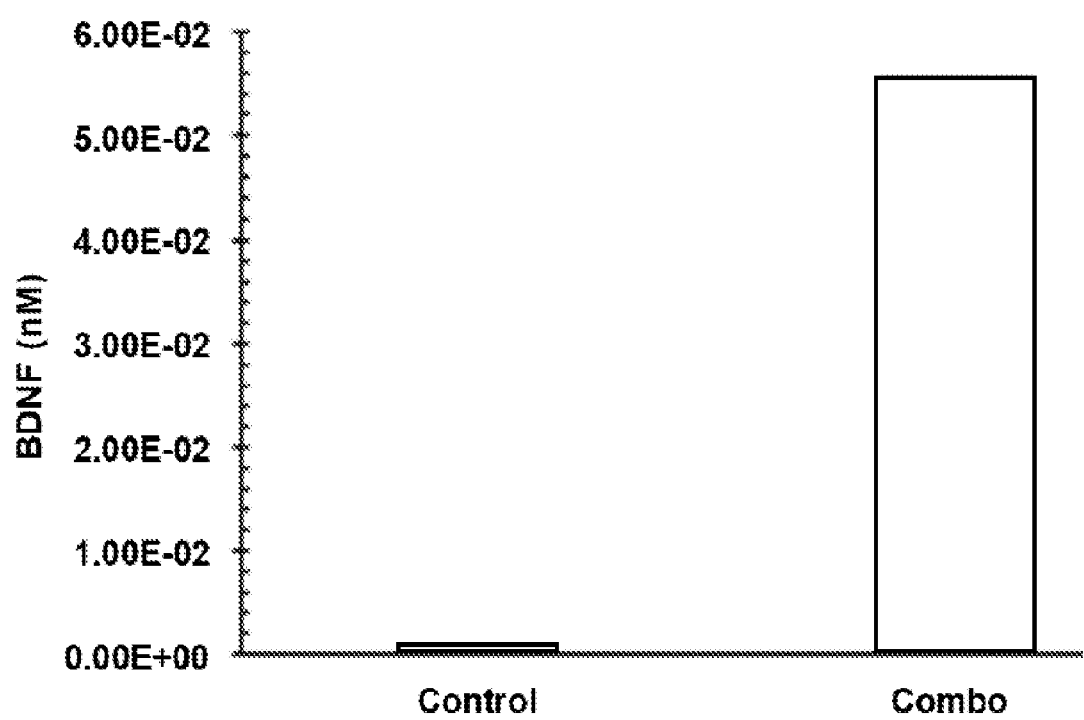
FIG. 6 is a bar graph comparing the concentration of BDNF (nM) for combination of vitamin E and epicatechin versus a control. The plot is based on a biomolecular computational model using CytoSolve® and modeling the mechanisms of BDNF synthesis pathway.

FIG. 6 was derived by using CytoSolve® to model mechanisms of BDNF synthesis pathway. Once these pathways were integrated using CytoSolve®, the resulting biomolecular computational model was used to identify the ranges of concentrations of Vitamin E and epicatechin that elicit a synergistic effect on the biomarker, glutamate. The amounts of Vitamin E and epicatechin from Table 5 were used to model the effect on glutamate versus the control.

Figure 7:
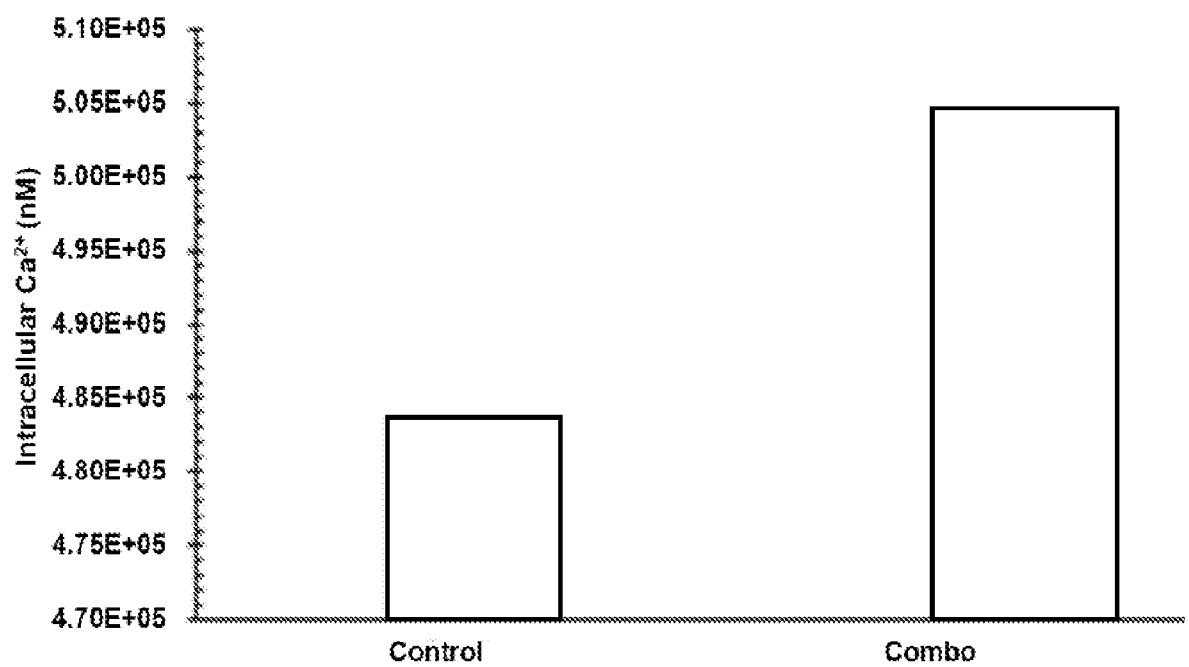
FIG. 7 a bar graph comparing the concentration of intracellular $Ca^{2+}$ (nM) for phosphatidylserine versus a control. The plot is based on a biomolecular computational model using CytoSolve® and modeling the mechanisms of NMDA and AMPA Receptor Signaling pathway.

FIG. 7 was derived by using CytoSolve® to model mechanisms of NMDA and AMPA Receptor Signaling pathway. Once these pathways were integrated using Cyto-Solve®, the resulting biomolecular computational model was used to identify the ranges of concentrations of phosphatidylserine that elicit a synergistic effect on the biomarkers glutamate and intracellular $[Ca^{2+}]$, see Table 5.

TABLE 5

| Components | Dosage Amount (mg) |
| --- | --- |
| vitamin E | 200 |
| epicatechin | 55 |
| phosphatidylserine | 103 |

Example 5. In Vitro Efficacy Testing of Long Term Memory and/or Focus Compositions Protocol The in vitro efficacy for the long term memory and/or focus composition (Composition B) is conducted using primary cell culture of hippocampal neurons as described in Edwards et al., 2011 (see, e.g., Edwards et al. *J Neurosci Methods.* 2011; 190; 2:155-163, which is incorporated by reference herein in its entirety). Experiments are conducted with and without the application of Composition B. BDNF is measured in the cell culture as an indicator of long term memory and/or focus. Samples from cell culture of neurons are withdrawn and tested for BDNF mRNA using RT-PCR and/or measuring BDNF protein using immunoprecipitation (e.g., a Western blot). BDNF protein levels are measured from cell culture of neurons using immunoprecipitation (e.g., a Western blot) (see, e.g., Amadio et al. *Int. J. Mol Sci.* 2017; 18(9): 1987; Sleiman et al. *Elife.* 2016; 5. pii: e15092; and Polacchini et al. *Sci. Rep.* 2015; 5: 17989).

Results

Comparison of BDNF levels in the cell culture with and without application of Composition B is performed to determine the efficacy of Composition B.

Example 6. Clinical Efficacy Testing of Long Term Memory and/or Focus Compositions Protocol A clinical efficacy study is conducted for Composition B using 100 subjects over a period of four (4) weeks. The clinical study protocol is described below.

Study Group Selection
1. Inclusion Criteria
   a. Age group: Adult population in the age group of ≥18 y
   b. Gender: Male and female (females should be on birth control)
   c. Education: Should be undertaking full-time post-secondary training at a four-year or two-year college or have completed such training
   d. Inclusion criteria test: Rey Auditory Verbal Learning Test (see, e.g., Labban et al. *J Sport Exerc Psychol.* 2018 Dec. 1; 40(6):336-342, which is incorporated by reference herein)
2. Exclusion criteria:
   a. Individuals with high scores (e.g. >6 on the scale of 1-10)
   b. Pregnant or nursing individuals
   c. Individuals with chronic illness
   d. Individuals receiving ADHD medication
   e. Individuals taking other memory/focus supplements
   f. Regular consumers of caffeine, nicotine and energy drinks Study Type Selection
   Placebo-controlled Randomized clinical study: Random allocation to either the group receiving the supplement under investigation or to a group receiving placebo treatment as the control Study Design Type
   Parallel-group: Each participant is randomly assigned to a group, and all the participants in the group receive (or do not receive) Composition B Outcome Measurements
   1. Are based on Rey Auditory Verbal Learning Test
   2. Include primary outcome and secondary outcome
   3. The outcome measurement is a self-monitored questionnaire (or a smartphone app) or reported by people who know the individual participating in the study Results Results obtained from the clinical study are analyzed to determine efficacy of Composition B using the following steps:
   3. Appropriate statistical tests are performed to estimate the change levels in the 95% confidence interval for the two study groups where the outcome measure is in the form of an ordinal level scale. Examples of such tests include:
      a. Wilcoxson Rank-Sum test
      b. Mann-Whiney U test
   4. An intention-to-treat (ITT) analysis is performed to overcome the issue arising from dropouts i.e. "Attrition bias."

Example 7. In Silico Simulations of Memory Maintenance and/or Focus Compositions Protocol The in silico simulations were performed using CytoSolve®, a commercially available tool that enables the computational modeling of biomolecular pathways. CytoSolve® can scale and model highly complex biomolecular phenomena by its ability to integrate and couple the computations of smaller biomolecular pathways (see, e.g., Ayyadurai and Forbes-Dewey Jr. Cellular and Molecular Bioengineering. 2011, 4(1):28-45; Nordsletten. IEEE Trans Biomed Eng. 2011; 58(12):3508-12; Ayyadurai and Deonikar. Agricultural Sciences. 2015; 6:630-662; Ayyadurai. Commun Med Care Compunetics. 2011; 1:115-168; Koo et al. Biophys J. 2013; 104(10):2295-306; Sweeney et al. Nat Neurosci. 2016; 19(6):771-83; and Ayyadurai. (2007) Scalable Computational Architecture for Integrating Biological Pathway Models (Doctoral Dissertation, Massachusetts Institute of Technology); each of which is hereby incorporated by reference in its entirety).

Results

Figure 8:
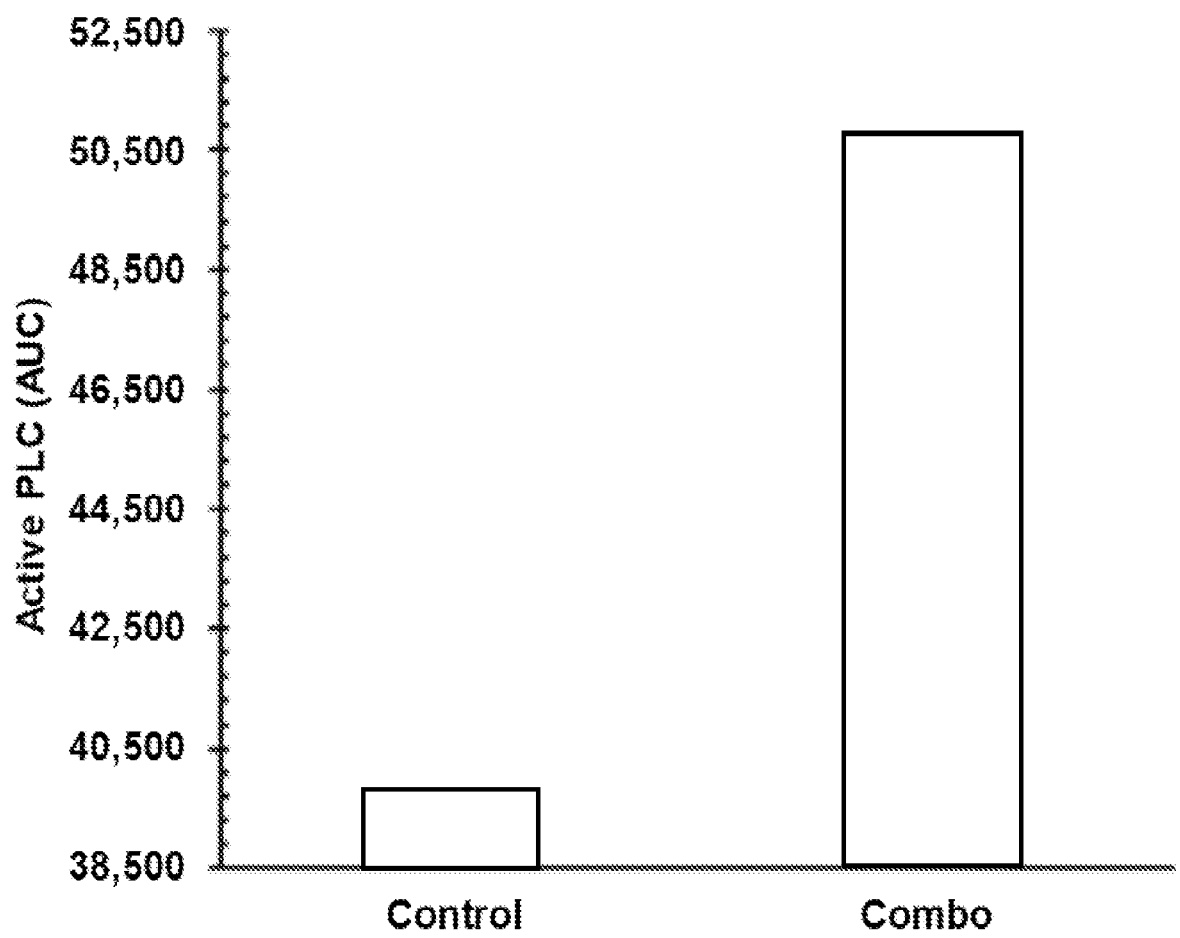
FIG. 8 is bar graph comparing the AUC of active phospholipase C (PLC) levels for a combination of huperzine A, asiatic acid, luteolin, quercetin, rosmarinic acid, ursolic acid, and caffeic acid versus a control. The plot is based on a biomolecular computational model using CytoSolve® and modeling the mechanisms of acetylcholine signaling pathway.

FIG. 8 was derived by using CytoSolve® to model mechanisms of Acetylcholine signaling pathway. Once these pathways were integrated using CytoSolve®, the resulting biomolecular computational model was used to identify the ranges of concentrations of huperzine A, asiatic acid, luteolin, quercetin, rosmarinic acid, ursolic acid, and caffeic acid that elicit a synergistic effect on the biomarker, active phospholipase C, see Table 6.

TABLE 6

| Components | Dosage Amount (mg) |
| --- | --- |
| huperzine A | 6 |
| asiatic acid | 100 |
| luteolin | 125 |
| quercetin | 50 |
| rosmarinic acid | 15 |
| ursolic acid | 24 |
| caffeic acid | 50 |

Example 8. In Vitro Efficacy Testing of Memory Maintenance and/or Focus Compositions Protocol The in vitro efficacy for the memory maintenance and/or focus compositions (Composition C) is conducted using primary cell culture of hippocampal neurons as described in Edwards et al., 2011 (see, e.g., Edwards et al. *J Neurosci Methods.* 2011; 190; 2:155-163, which is incorporated by reference herein in its entirety). Experiments are conducted with and without the application of Composition C. Acetylcholinesterase activity and/or active PLC concentrations are measured in the cell culture as an indicator of memory maintenance and/or focus. Samples from cell culture of neurons are withdrawn and tested for acetylcholinesterase activity using Acetylcholinesterase Assay Kit ab138871 from Abcam, the QUANTICHROM™ Acetylcholinesterase Assay Kit from BioAssay Systems, and the Acetylcholinesterase Assay Kit from Abnova (Cat. No. KA1607). Samples from cell culture of neurons are withdrawn and tested for active PLC by measuring phosphorylated PLC using immunoprecipitation (e.g., a Western blot) in cell lysate and measuring phosphorylated PLC in intact cells by radiolabeling PLC and measuring it using x-ray radiography (see, e.g., Gomez-Cambronero. *Methods Mol. Biol.* 2003; 218:155-76, which is incorporated herein by reference in its entirety).

Results

Comparison of acetylcholinesterase and active PLC levels in the cell culture with and without application of Composition C is performed to determine the efficacy of Composition C.

Example 9. Clinical Efficacy Testing of Memory Maintenance and/or Focus Compositions Protocol A clinical efficacy study is conducted for Composition C using 100 subjects over a period of four (4) weeks. The clinical study protocol is described below.

Study Group Selection
- 3. Inclusion Criteria
  - a. Age group: Adult population in the age group of ≥18 y
  - b. Gender: Male and female (females should be on birth control)
  - c. Education: Should be undertaking full-time post-secondary training at a four-year or two-year college or have completed such training
  - d. Inclusion criteria test: Continuous Performance Test-Identical Pairs (CPT-IP)
- 4. Exclusion criteria:
  - a. Individuals with high scores (e.g. >6 on the scale of 1-10)
  - b. Pregnant or nursing individuals
  - c. Individuals with chronic illness
  - d. Individuals receiving ADHD medication
  - e. Individuals taking other memory/focus supplements
  - f. Regular consumers of caffeine, nicotine and energy drinks Study Type Selection
- Placebo-controlled Randomized clinical study: Random allocation to either the group receiving the supplement under investigation or to a group receiving placebo treatment as the control Study Design Type
- Parallel-group: Each participant is randomly assigned to a group, and all the participants in the group receive (or do not receive) Composition C Outcome Measurements
- 4. Are based on CPT-IP
- 5. Include primary outcome and secondary outcome
- 6. The outcome measurement is a self-monitored questionnaire (or a smartphone app) or reported by people who know the individual participating in the study Results Results obtained from the clinical study are analyzed to determine efficacy of Composition C using the following steps:
- 5. Appropriate statistical tests are performed to estimate the change levels in the 95% confidence interval for the two study groups where the outcome measure is in the form of ordinal level scale. Examples of such tests include:
  - a. Wilcoxson Rank-Sum test
  - b. Mann-Whiney U test
- 6. An intention-to-treat (ITT) analysis is performed to overcome the issue arising from dropouts i.e. "Attrition bias."

Other Embodiments

It is to be understood that while the invention has been described in conjunction with the detailed description thereof, the foregoing description is intended to illustrate and not limit the scope of the invention which is defined by the scope of the appended claims. Other aspects, advantages, and modification are within the scope of the following claims.

What is claimed is:

1. A composition consisting of:
D-glutamine present in an amount of about 20% to about 30% w/w of the composition;
ginkgolide B present in an amount of about 0.1% to about 0.4% w/w of the composition;
phosphatidylserine present in an amount of about 65% to about 80% w/w of the composition; and
ascorbic acid in an amount of about 0.5% to about 2.5% w/w of the composition.

2. A method for improving and/or stabilizing the short-term memory of a subject comprising orally administering the composition of claim 1.

* * * * *